(12) United States Patent
Ito

(10) Patent No.: US 6,985,265 B2
(45) Date of Patent: Jan. 10, 2006

(54) IMAGE FORMING DEVICE AND SHEET FEEDING DEVICE

(75) Inventor: Yoshiyuki Ito, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 760 days.

(21) Appl. No.: 09/987,175

(22) Filed: Nov. 13, 2001

(65) Prior Publication Data

US 2002/0080426 A1 Jun. 27, 2002

(30) Foreign Application Priority Data

Nov. 13, 2000 (JP) .......................... 2000-345513
Nov. 13, 2000 (JP) .......................... 2000-345514

(51) Int. Cl.
*H04N 1/00* (2006.01)

(52) U.S. Cl. .................. 358/400; 358/498; 358/496; 271/171; 271/120; 399/395; 399/92

(58) Field of Classification Search ................ 358/400, 358/498, 496; 271/171, 120, 121, 167; 399/395, 399/92

See application file for complete search history.

(56) References Cited

U.S. PATENT DOCUMENTS

| | | | | |
|---|---|---|---|---|
| 4,786,042 A | * | 11/1988 | Stemmle ..................... | 271/9.1 |
| 5,021,827 A | * | 6/1991 | Komiya et al. .............. | 399/11 |
| 5,333,852 A | * | 8/1994 | Mililto et al. ............... | 271/171 |
| 5,348,283 A | * | 9/1994 | Yanagi et al. ............... | 271/127 |
| 5,642,952 A | * | 7/1997 | Tomatsu et al. ............ | 400/624 |
| 6,116,590 A | | 9/2000 | Yokoyama et al. | |
| 6,267,371 B1 | * | 7/2001 | Jessop ........................ | 271/171 |
| 6,300,970 B1 | * | 10/2001 | Hamada et al. ............. | 347/264 |
| 6,357,861 B1 | * | 3/2002 | Katsumi ..................... | 347/55 |

FOREIGN PATENT DOCUMENTS

| | | |
|---|---|---|
| JP | U 60-50630 | 4/1985 |
| JP | A 61-136835 | 6/1986 |
| JP | 03-102040 | 4/1991 |
| JP | B2 3-64411 | 10/1991 |
| JP | 08-119462 | 5/1996 |
| JP | A 8-157077 | 6/1996 |
| JP | 10-265059 | 10/1998 |
| JP | 10-316253 | 12/1998 |
| JP | 11-139572 | 5/1999 |
| JP | 11-165881 | 6/1999 |

* cited by examiner

*Primary Examiner*—Kimberly Williams
*Assistant Examiner*—Negussie Worku
(74) *Attorney, Agent, or Firm*—Oliff & Berridge, PLC

(57) ABSTRACT

A printer including a main body and a sheet-supply cassette attachable to and detachable from the main body. The sheet-supply cassette includes a sheet guide movable to a position that depends on size of sheets in the cassette, cam abutment portion that moves integrally with the sheet guide, a cam that moves away from the cam abutment portion when the cassette is detached from the main body, and a detected portion that moves in a linked manner with the cam. The main body includes a cam mover that, when the sheet-supply cassette is attached to the main body, moves the cam until the cam surface of the cam abuts the cam abutment portion and a detection portion that detects the detected portion moved in a linked manner with the cam. The cam surface has a shape that varies movement amount of the cam into abutment with the abutment portion by the cam mover in accordance with the position of the sheet guide.

51 Claims, 17 Drawing Sheets

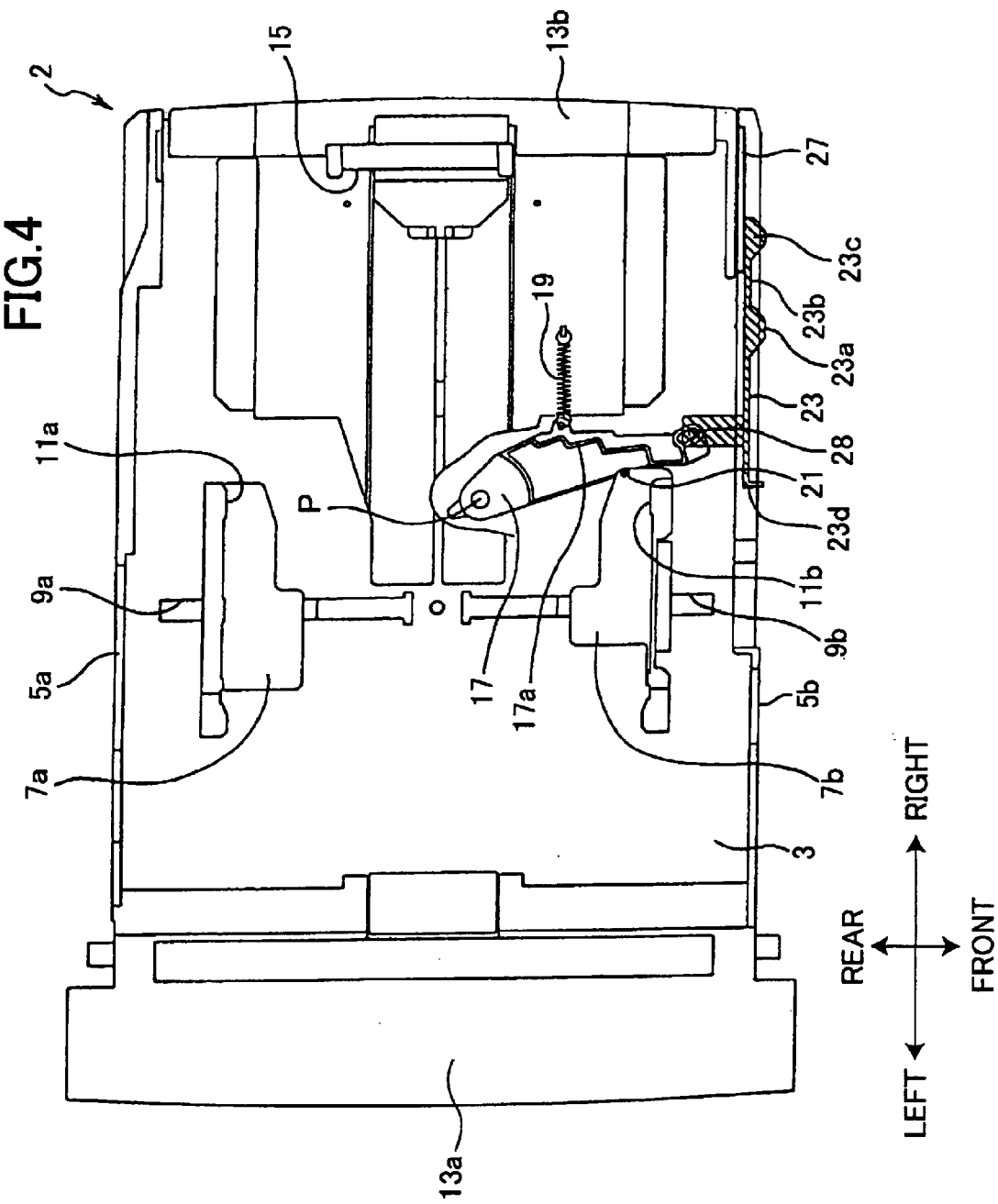

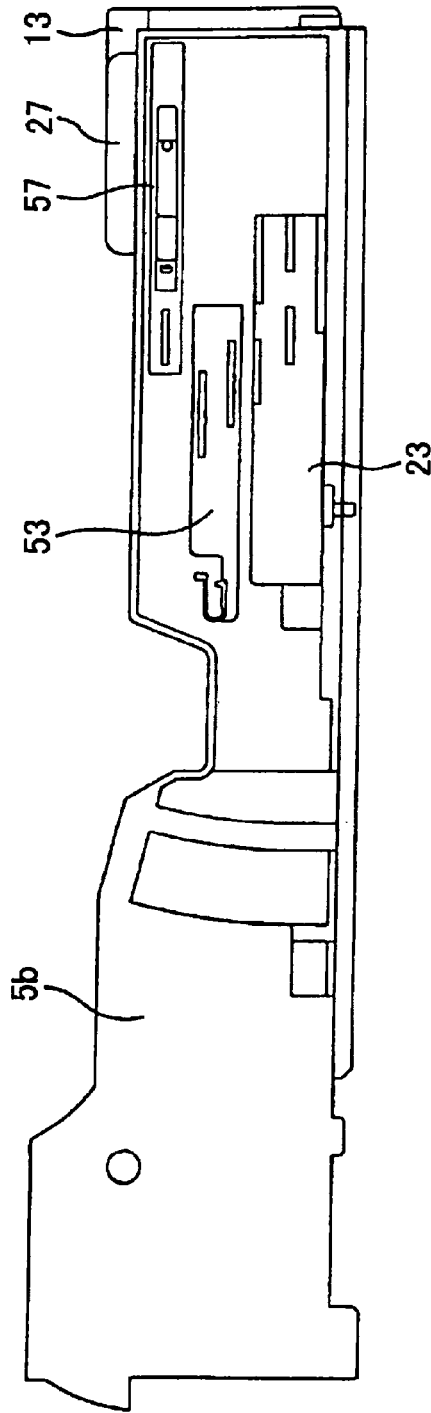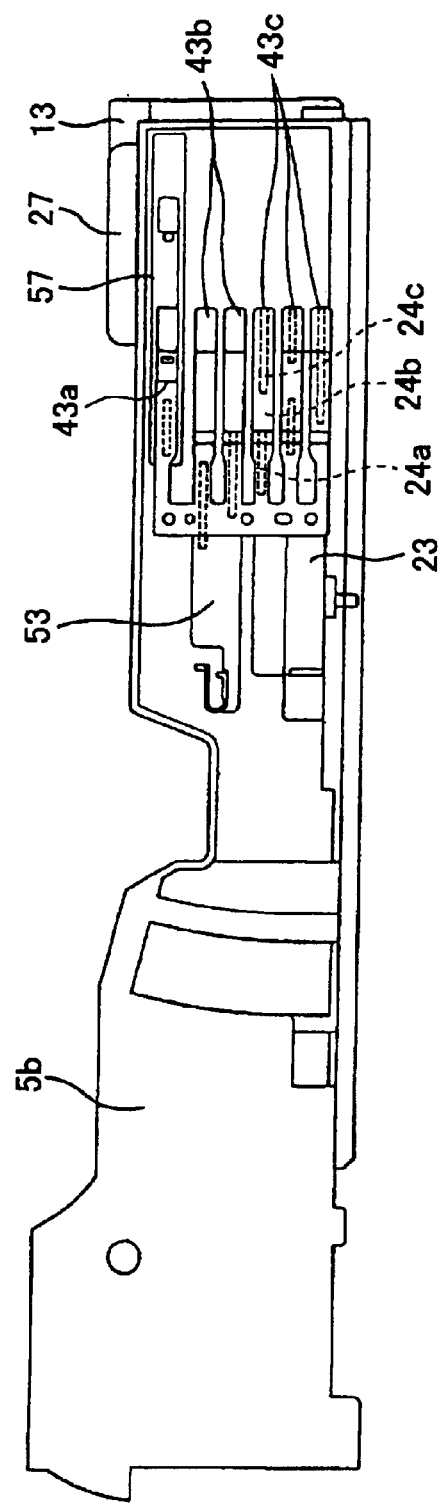

FIG.12
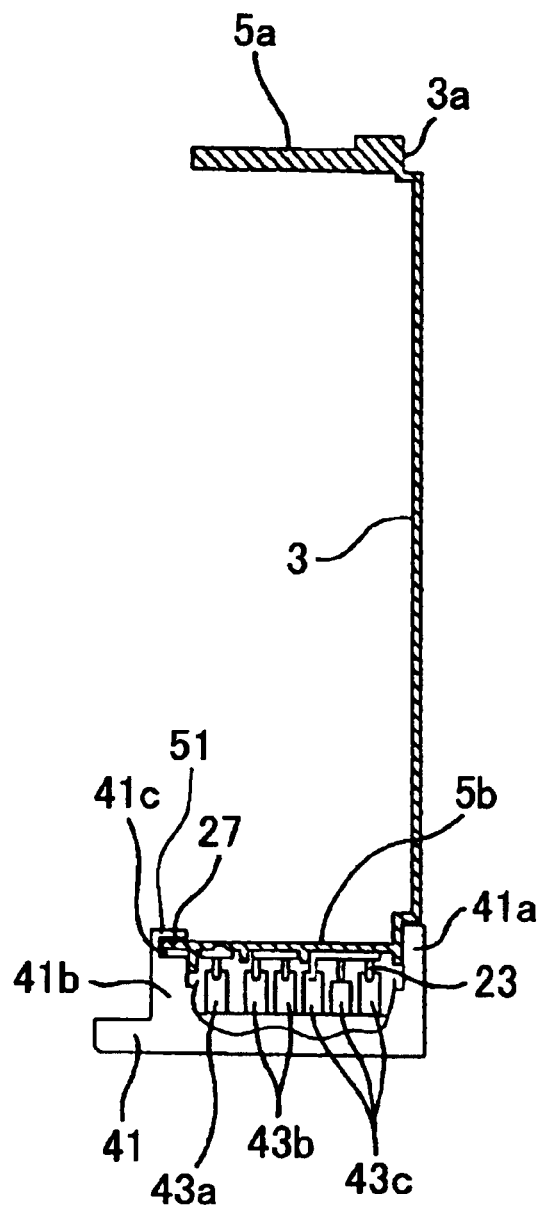
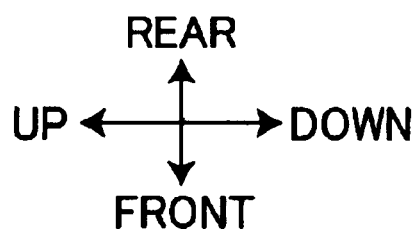

IMAGE FORMING DEVICE AND SHEET FEEDING DEVICE

BACKGROUND OF THE INVENTION

1. Field of the Invention

The present invention relates to image forming devices, such as printers, facsimile machines, and copy machines, and to a sheet feeding device that supplies sheets to an image forming device.

2. Description of the Related Art

Various image forming devices are well known for use with personal computers and the like. Examples of image forming devices include laser printers, ink jet printers, facsimile machines, and copy machines. Image forming devices are often provided with a sheet-supply cassette for housing sheets, which are the subject of printing operations. The sheet-supply cassette supplies the sheets to the image forming device.

Japanese Utility-Model-Application Publication No. SHO-60-50630 describes a type of detected portion for indicating the size of sheets stacked in a sheet-supply cassette of a copy machine. The copy machine includes a cassette mount for receiving insertion of the sheet-supply cassette. The cassette mount includes a sensor and an actuator disposed adjacent to an outer side surface of the sheet-supply cassette. The outer side surface of the sheet-supply cassette is formed with alternating and equidistant protrusions and indentations aligned in the direction the sheet-supply cassette moves when inserted into the cassette mount. An independent size setting member is provided with protrusions with size and interspacing that correspond to the indentations on the side wall of the sheet-supply cassette. The protrusions of the size setting member can be inserted into the indentations on the sheet-supply cassette to fill in the indentations. The user fits the protrusions of the size setting member into the indentations of sheet-supply cassette at a position shifted according to the size of sheet housed in the sheet-supply cassette. When the sheet-supply cassette is inserted into the copy machine, the actuator moves in and out of the indentations of the sheet-supply cassette, turning the sensor on and off accordingly. Because the actuator does not move into the indentations of the sheet-supply cassette that are filled in with the protrusions of the size setting member, the copy machine can determine the type of sheet in the sheet-supply cassette by the on/off signal from the sensor.

SUMMARY OF THE INVENTION

The configuration described in Japanese Utility-Model-Application Publication No. SHO-60-50630 has a problem in that detection of sheet size might not be correct. That is, the side wall of the sheet-supply cassette might deform under the pressing force of the spring when the spring presses protrusions against the side wall of the sheet-supply cassette. As a result, the spring might not receive a sufficient repulsive force to turn on the sensor, resulting in the sensor remaining in an off condition when it should be turned on by a protrusion. As a result, the information about the size of sheets in the sheet-supply cassette might be mistaken.

It is an objective of the present invention to accurately transfer information used to distinguish sheet size to an image forming unit or a sheet-supply device.

To achieve this objective, an image forming device according to a first aspect of the present invention include a main body and a sheet-supply cassette attachable to and detachable from the main body. A detected portion is provided on a side wall of the sheet-supply cassette. A pressing portion of the main body presses the detected portion against the side wall when the sheet-supply cassette is mounted in the main body. An information detection portion receives repulsive force from the pressing portion and, based on the repulsive force, detects information indicated by the detected portion. A side wall support supports the side wall that is provided with the detected portion. With this configuration, the side wall will not bend even when the pressing portion presses against the detected portion. Therefore, the information detection portion will not mistakenly detect information from the detected portion. If the information indicated by the detected portion is about size of sheets in sheet-supply cassette or about the type of sheet-supply cassette, then erroneous detection of this information by the information detected portion can be prevented.

According to a second aspect of the present invention, the sheet-supply cassette includes a guide that guides edges of sheets housed in the sheet-supply cassette, a cam abutment portion, a cam with a cam surface, and a detected portion. The guide is movable to change position in accordance with size of housed sheets and the cam abutment portion moves to a position that corresponds to the position of the guide. The cam is movable so that the cam surface selectively moves toward and away from the cam abutment portion. The cam moving to a separated position, wherein the cam surface is separated from the cam abutment portion, when the sheet-supply cassette is detached from the main body. The detected portion moves in a linked manner with the cam.

The main body includes a cam mover and a detected portion. The cam mover moves the cam until the cam surface of the cam abuts the cam abutment portion when the sheet-supply cassette is attached to the main body. The detection portion that detects the detected portion moved in a linked manner with the cam.

The cam surface has a shape that varies movement amount of the cam into abutment with the abutment portion by the cam mover in accordance with the position of the guide.

With this configuration, when the sheet-supply cassette is in a detached condition from the main body, the cam and the cam abutment portion will be separated from each other Accordingly, the cam and the detected portion do not need to be moved in order to move the guides. Therefore, the guides can be easily moved It should be noted that the cam mover need not move the cam directly. For example, configuration can be provided so that the cam moves in linking association with movement of the detected portion as in the case of the embodiment of the present invention. In this case, the cam mover can move the detected portion to indirectly move the cam.

The same good effects of the second aspect of the invention can be achieved if the cam and cam abutment portion are reversed so that the cam moves to a position that corresponds to the position of the guide and so that the cam abutment portion moves selectively toward and away from the cam abutment portion.

The same good effects of the first and second aspects of the invention can be achieved by applying the present invention to a sheet-supply device instead of an image forming device. A sheet-supply device normally includes a plurality of different sheet-supply cassettes mounted in a main body. The sheet-supply device selects one of the sheet-supply cassette and supplies sheets from it to an image forming unit for printing. Some sheet-supply devices have only a single sheet-supply cassette, but this type of sheet-supply device is used with several stacked one on top of the other. The present invention can be applied to any type of sheet-supply device, and achieve the same desirable effects.

According to a third aspect of the present invention, a sheet-supply cassette is used mounted in a sheet-supply device that includes a side wall supporter. A switching plate is provided in a cassette body so as to be switchably movable between a closing-off position and an expansion position. When in the closing-off position, the switching plate closes off a front opening defined by a base and a pair of side walls of the cassette body. When in the expansion position, the switching plate expands the holding space of the cassette body to enable the cassette body to house larger sheets than when the switching plate is in the closing-off position. A free side of one of the side walls is provided with a supported portion that contacts and is supported by the side wall supporter when the sheet-supply cassette is mounted in the sheet-supply device. The supported portion extends further from the base of the cassette body than a portion of the switching plate that is positioned near the supported portion.

With this configuration, the cassette body can house large-sized sheets when the switching plate is in the expansion position, even if the cassette body were unable to house the large-sized sheet when the switching plate is in the closing-off position. It should be noted that the side wall is more likely to bend when the switching plate is in the expansion position. However, the side wall is prevented from bending because the side wall support supports the supported portion of the upper edge of the side wall Because the supported portion is further from the base than the portion of the switching plate that is nearest the supported portion, the side wall supporter can support the side wall easily without interfering with movement of the sheet-supply cassette when the sheet-supply cassette is mounted into the sheet-supply device.

BRIEF DESCRIPTION OF THE DRAWINGS

The above and other objects, features and advantages of the invention will become more apparent from reading the following description of the embodiment taken in connection with the accompanying drawings in which:

FIG. 4 is a plan view showing the sheet-supply cassette before it is inserted into the printer, with portions cut away to facilitate understanding of arrangement of components on a base of the sheet-supply cassette;

FIG. 5 is a front view showing first to third sliders of the sheet-supply cassette of FIG. 3;

FIG. 6 is a front view showing relative positions of printer-side springs and the first to third sliders of the sheet-supply cassette when the sheet-supply cassette is mounted in the laser printer;

FIG. 12 is a right-hand view showing the sheet-supply cassette of FIG. 11, with a portion cut away to show a protrusion/spring configuration for indicating sheet size to the laser printer;

DETAILED DESCRIPTION OF THE EMBODIMENT

Next, a laser printer 1 according to an embodiment of the present invention will be described while referring to the attached drawings. Unless mentioned otherwise, directional terms such as left, right, front, and rear will be used in the following explanation assuming that the laser printer 1 is in the orientation in which it is intended to be used.

Figure 1:
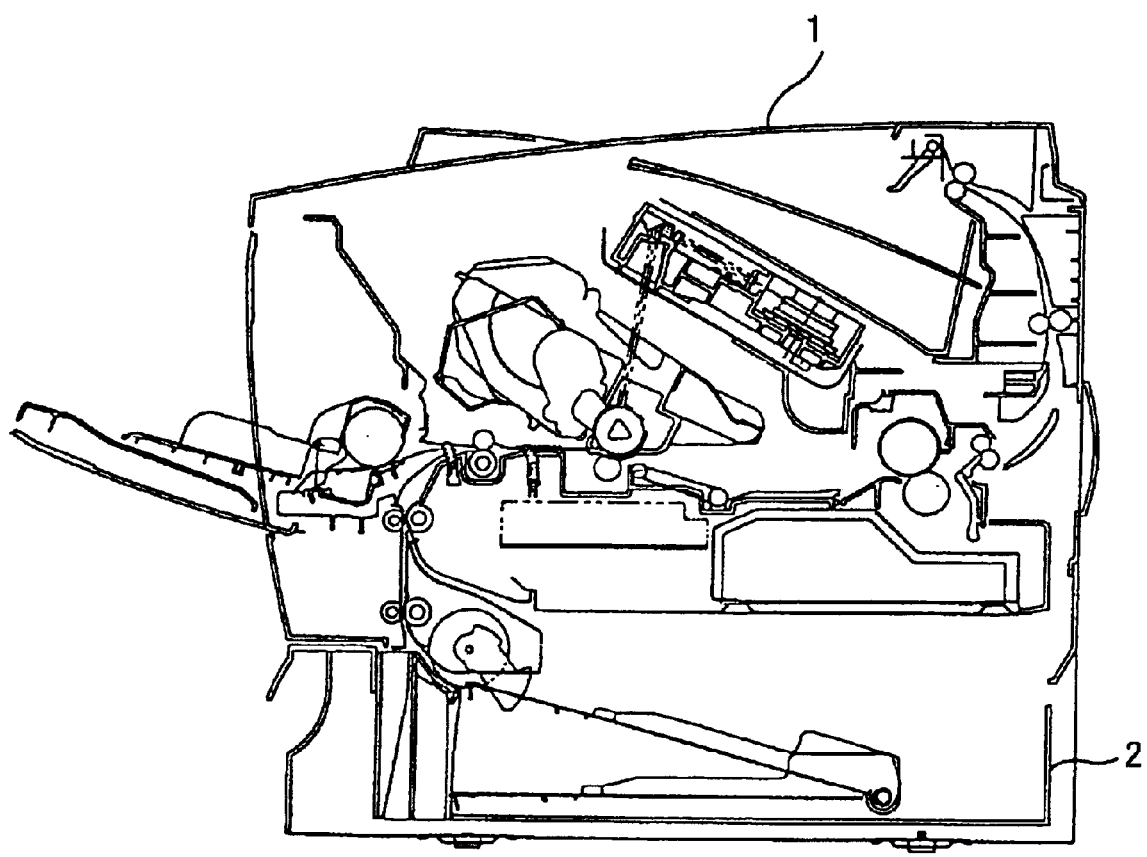
FIG. 1 is a side view in cross-section showing a laser printer according to an embodiment of the present invention.
Figure 2:
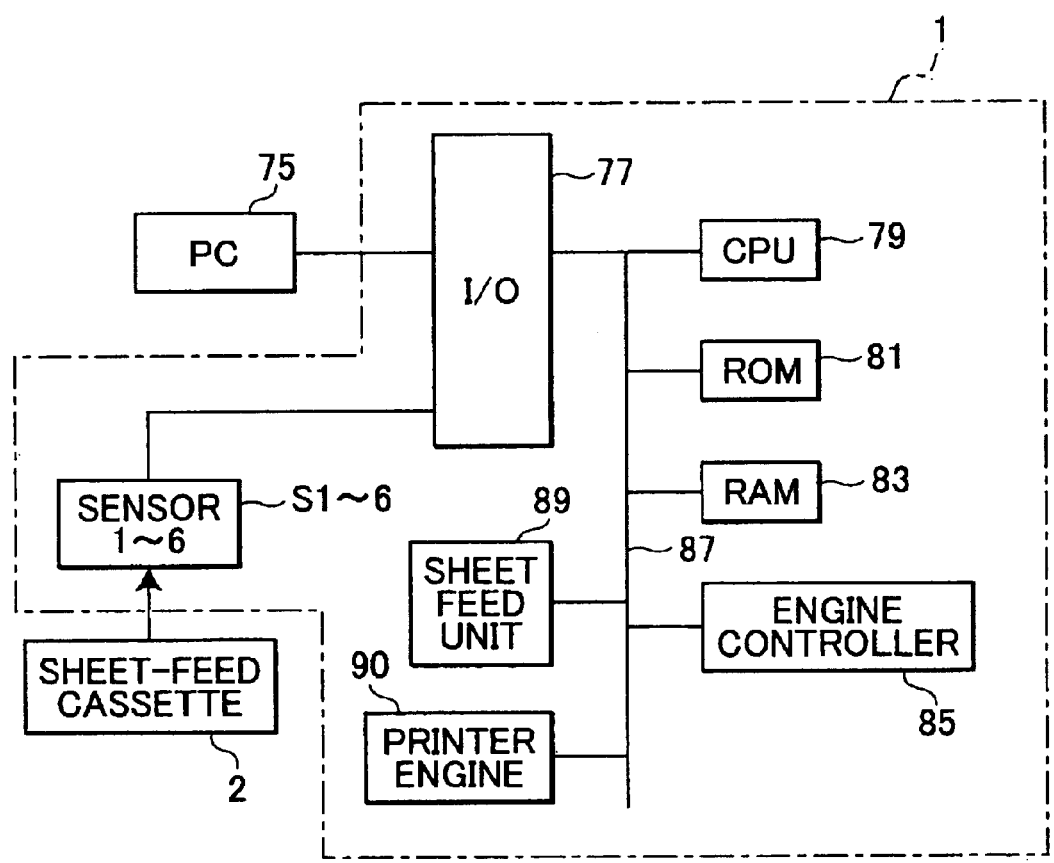
FIG. 2 is a block diagram showing electrical components of the laser printer of FIG. 1.

FIG. 1 shows the laser printer 1 with a sheet-supply cassette 2. As shown in FIG. 2, the laser printer 1 includes sensors 1 to 6 for detecting various information about sheets in the sheet-supply cassette 2, a sheet-feed unit 89 for drawing sheets out from the sheet-supply cassette 2, and a printer engine 90 for forming images on sheets fed in from the sheet-feed unit 89. The laser printer 1 further includes an input/output interface 77 for inputting and outputting data, a CPU 79 for controlling a variety of processes such as image forming, a RAM 83 for temporarily storing data processed by the CPU 79, an engine controller 85 for controlling the printer engine 90, and a bus for connecting all of the other components together. The input/output interface 77 receives input of image data from the personal computer 75 and input of information about the sheet-supply cassette 2 from the sensors 1 to 6.

Figure 3:
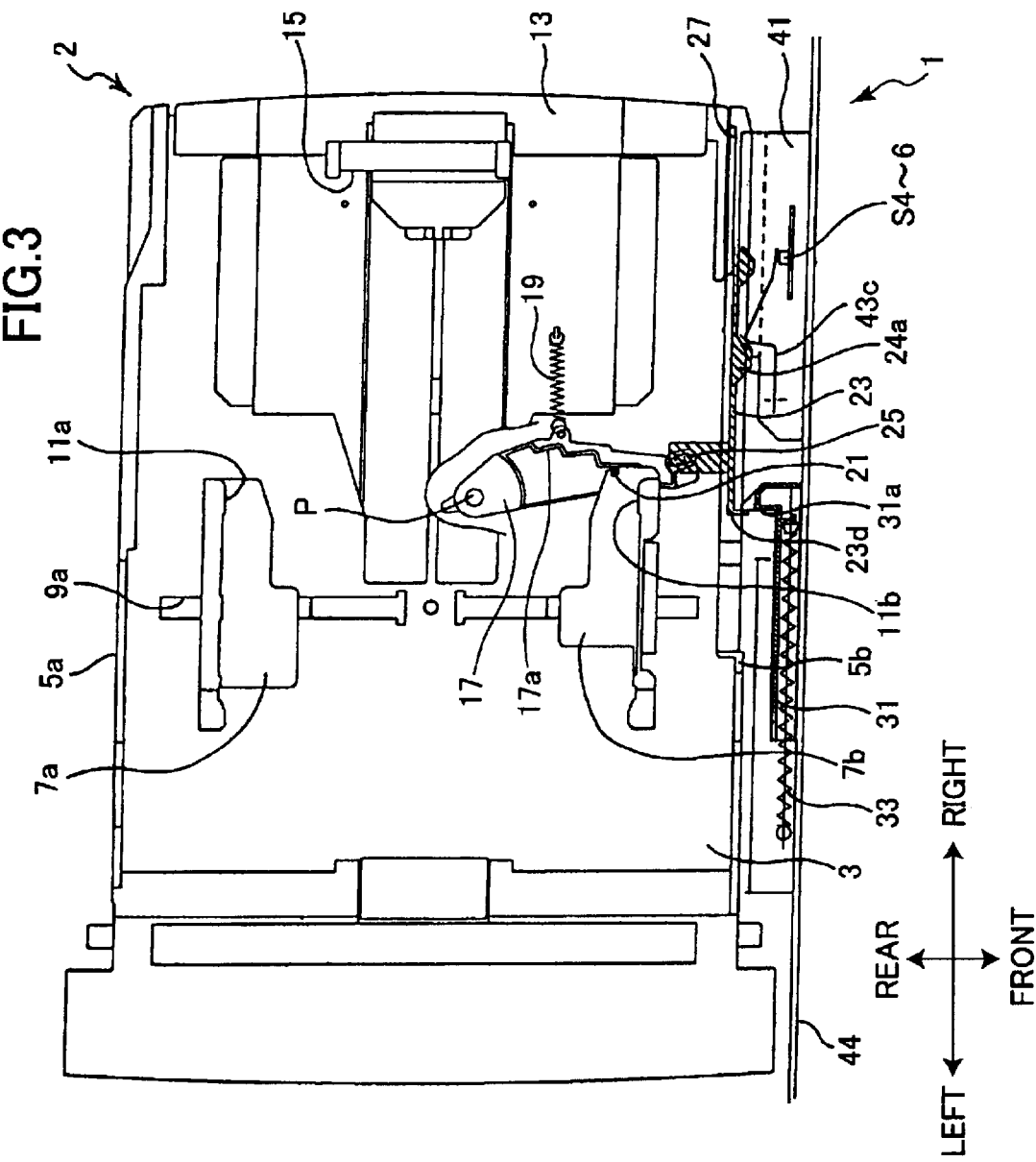
FIG. 3 is a plan view with portions cut away showing a sheet-supply cassette mounted in the laser printer.

The sheet-supply cassette 2 is mounted into the chassis as shown in FIG. 3. Although not shown in the drawings, the chassis 44 is formed with a cassette mounting opening to the left side of FIG. 3 The sheet-supply cassette 2 is inserted through the cassette mounting opening to mount the sheet-supply cassette 2 into the laser printer 1. The chassis 44 is formed with front and rear cassette holders 41 in the deepest portion of the printer 1 away from the cassette mounting opening. (Only the front cassette holder 41 is shown in FIG.

4.) The pair of cassette holders support the sheet-supply cassette 2 mounted in the laser printer 1. The right end of the sheet-supply cassette 2 aligns with the cassette holders 41 when the sheet-supply cassette 2 is fully inserted into the laser printer 1.

The printer 1 includes three sets of stainless steel plate springs 43a, 43b, 43c (only one of the set of springs 43c is shown in FIG. 3), an engagement portion 31, and a pulling spring 33. The sensors S1 to S6 are disposed adjacent to the springs 43a to 43b (although only one of the sensors S4 to S6 is shown in FIG. 3).

Here, description of the sheet-supply cassette 2 will be provided. FIG. 4 shows the sheet-supply cassette 2 before it is inserted into the chassis 44 of the printer 1. The sheet-supply cassette 2 is made from a resin material into a lidless box shape having a base 3, side walls 5a, 5b connected integrally to the front and rear sides respectively of the base 3, a handle 13a on the left side of the base 3, and an extension tray at the right side of the base 3. A user grasps the handle H to slide the sheet-supply cassette 2 rightward into the chassis 44 (or leftward when pulling the sheet-supply cassette 2 out of the chassis 44). The extension tray 13b is slidably disposed on the base 3 and is not formed integrally with the base 3. That is, the right portion of the sheet-supply cassette 2, which is the front end in the direction in which the sheet-supply cassette 2 is moved when inserted into the laser printer 1, is not formed with an integral wall, but has an open C-shape defined by the base 3 and the two side walls 5a, 5b. The extension tray 13b is disposed in the C-shape as a member independent from the body of the sheet-supply cassette 2. The extension tray 13b is drawn out to the right when legal-sized sheets are to be housed in the sheet-supply cassette 2. An abutment portion 15 is attached to the extension tray 13b and abuts against the right-hand short edge of sheets housed in the sheet-supply cassette 2. Said differently, the extension tray 13b is switchably movable between a closing-off position, wherein the extension tray 13b closes off the C-shaped opening, and an expansion position, wherein the holding space of the cassette 2 is expanded to enable the cassette 2 to house larger sheets than when the extension tray 13b is in the closing-off position. With this configuration, the cassette 2 can house large-sized sheets when the extension tray 13b is in the expansion position, even if the cassette 2 were unable to house the large-sized sheet when the extension tray 13b is in the closing-off position.

The sheet-supply cassette 2 includes a pair of guides 7a, 7b, a cam 17 pivotably disposed adjacent to the guide 7b about a pivot shaft P, a spring 19 urging the cam 17 to separate from the guide 7b, a first slider 23 connected to slide in linking connection with pivoting movement of the cam 17. As shown in FIGS. 5 and 6, a second and third sliders 53, 57 are further provided to the sheet-supply cassette 2. FIGS. 5 and 6 show positions of the sliders 23, 53, and 57 while the sheet-supply cassette 2 is inserted into the printer 1. It should be noted that FIG. 4 shows the sheet-supply cassette 2 with the second and third sliders 53 57 removed to facilitate understanding.

The guides 7a, 7b are for aligning and guiding sheets (not shown) stacked in the sheet-supply cassette 2. The guides 7a, 7b include abutment portions 11a, 11b respectively and are slidably disposed in grooves 9a, 9b formed in the base 3. The guide 7b includes a boss 21 that moves in accordance with movement of the guide 7b. To use the guides 7a, 7b, a user first places a stack of sheets in between the abutment portions 11a, 11b with the widthwise dimension of the sheets aligned front and rear. Then the user moves one or both of the guides 7a, 7b toward the stack. At this time, a linking mechanism (not shown) moves both of the guides 7a, 7b symmetrically toward each other following the grooves 9a, 9b. Once the abutment portions 11a, 11b abut long edges of the sheets, the abutment portions 11a, 11b are separated by the width distance of the sheets. It should be noted that when the guides 7a, 7b are adjusted in this way, the boss 21 is moved to a position that corresponds to the size of sheet supported in the sheet-supply cassette 2 because the boss 21 moves with the guide 7b.

Figure 7:
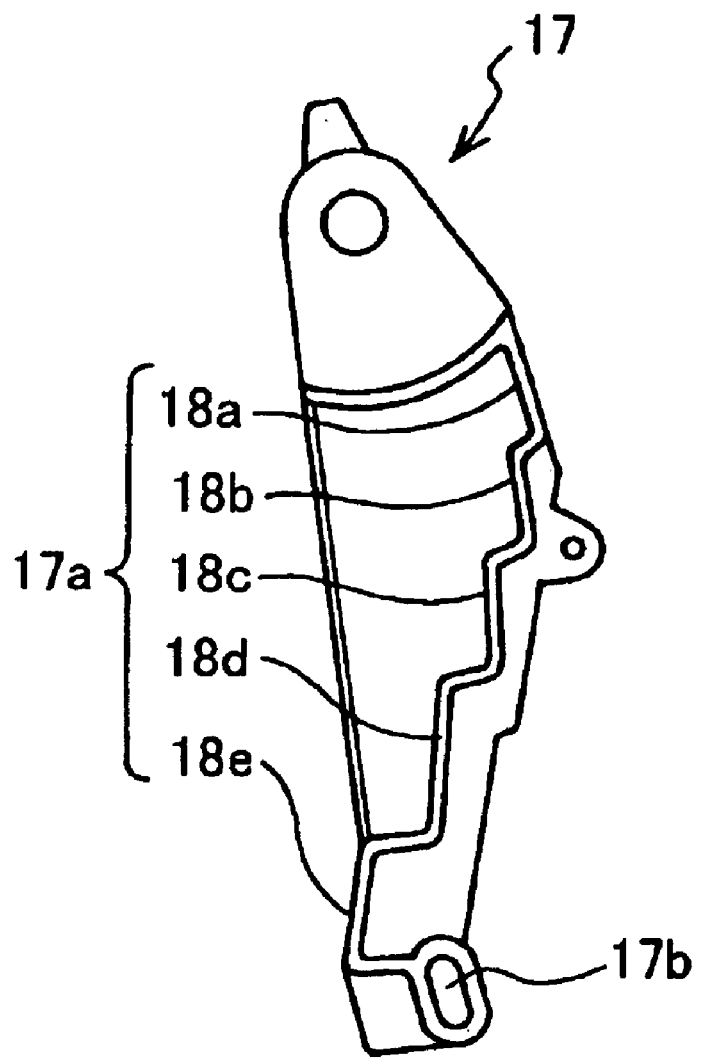
FIG. 7 is a plan view showing details of a can provided in the sheet-supply cassette.

The cam 17 is formed with a step-like cam surface 17a at the side thereof facing the guide 7b and with a slot 17b at its free tip. As shown in FIG. 7, the cam surface 17a is formed with five step surfaces 18a to 18e The pulling spring 19 urges the cam 17 to pivot about its pivot axis P away from the guide 7b, that is, in the clockwise direction as viewed in FIG. 4. As a result, the can surface 17a and the boss 21 are reliably separated from each other by the urging force of the pulling spring 19 when the sheet-supply cassette 2 is not mounted in the laser printer 1 as shown in FIG. 4. The pivot position of the cam 17 at this time will be referred to as the separated position hereinafter.

Figure 8:
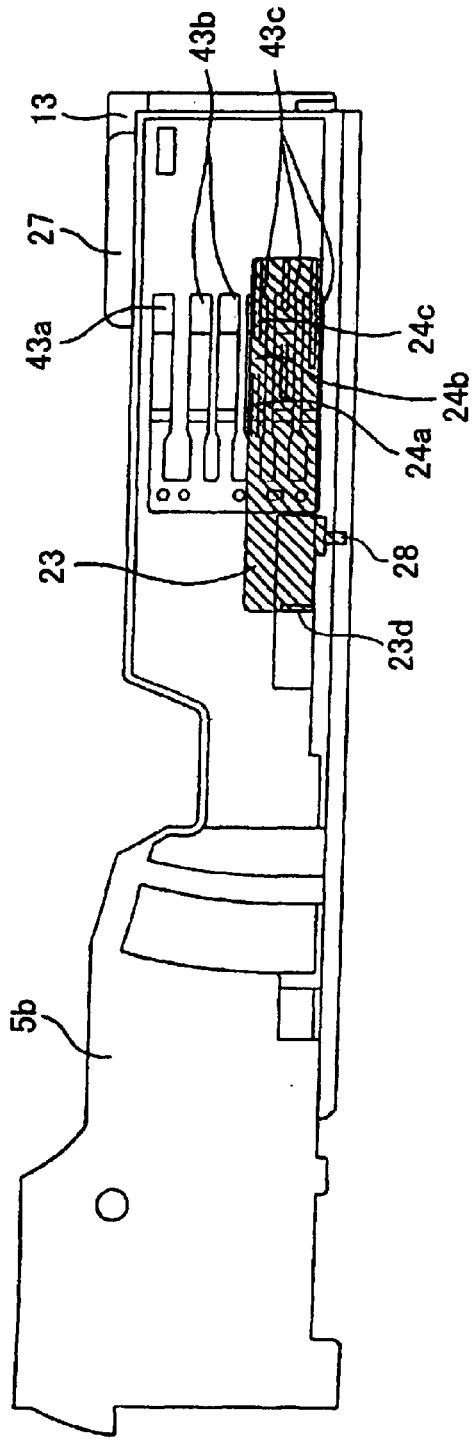
FIG. 8 is a front view showing relative positions of printer-side springs and the first slider when the sheet-supply cassette is mounted in the laser printer as in FIG. 3.
Figure 9:
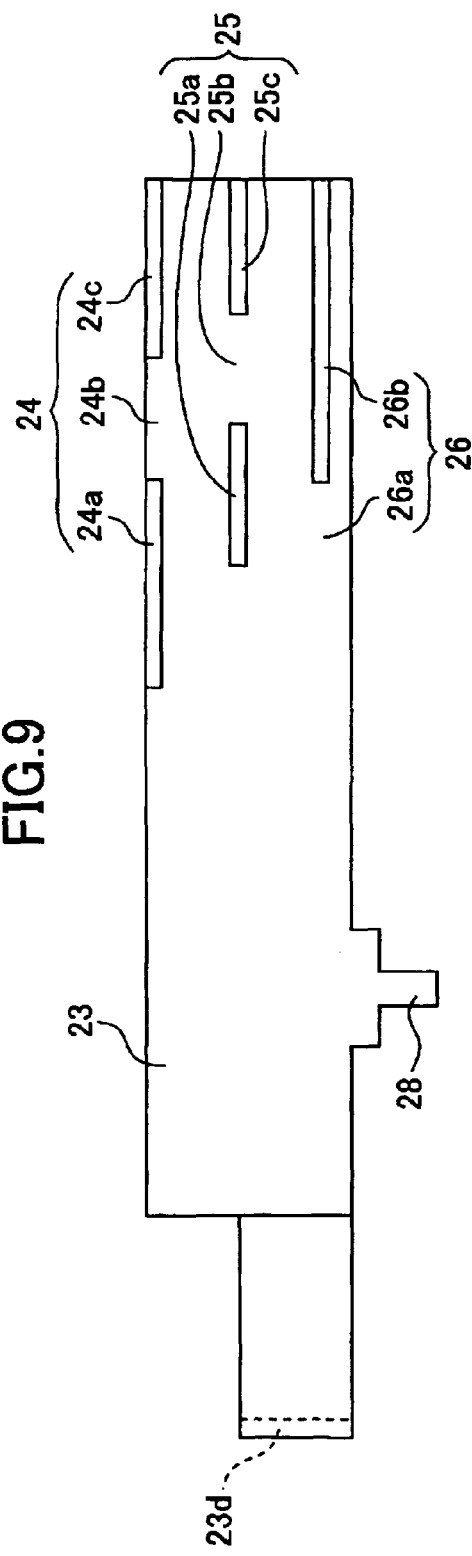
FIG. 9 is a plan view showing details of the first slider.

The first slider 23 is disposed on the right end of the side wall 5b so as to be slidable leftward and rightward. As shown in FIGS. 8 and 9, the first slider 23 includes a boss 28, three vertically aligned protrusion/indentation rows 24, 25, and 26, and an integral engaged portion 23d. The boss 28 is provided on the first slider 23 so as to extend in parallel with the pivot shaft P of the cam 17. The boss 28 is inserted into the slot 17b of the cam 17 so that the first slider 23 slides rightward or leftward in linking association with pivoting movement of the cam 17. As a result, the urging force from the pulling spring 19 moves the first slider 23, via the cam 17, to a rightward most position shown in FIG. 4 while the sheet-supply cassette 2 is not mounted in the laser printer 1 Further rightward movement of the first slider 23 is stopped by a stopper (not shown).

As shown in FIG. 9, each of protrusion/indentation rows 24, 25, 26 includes horizontally extending rows of protrusions and indentations. The uppermost row 24 includes a protrusion 24a, an indentation 24b, and a protrusion 24c aligned horizontally. The middle row 25 includes a protrusion 25a, an indentation 25b, and a protrusion 25c. The lowermost row 26 includes an indentation 26a and a protrusion 26b. Note that the protrusions and indentations are positioned differently in each row 24, 25, 26 so that protrusion/indentation patterns in the vertical direction are different at different positions in the horizontal direction.

Figure 10:
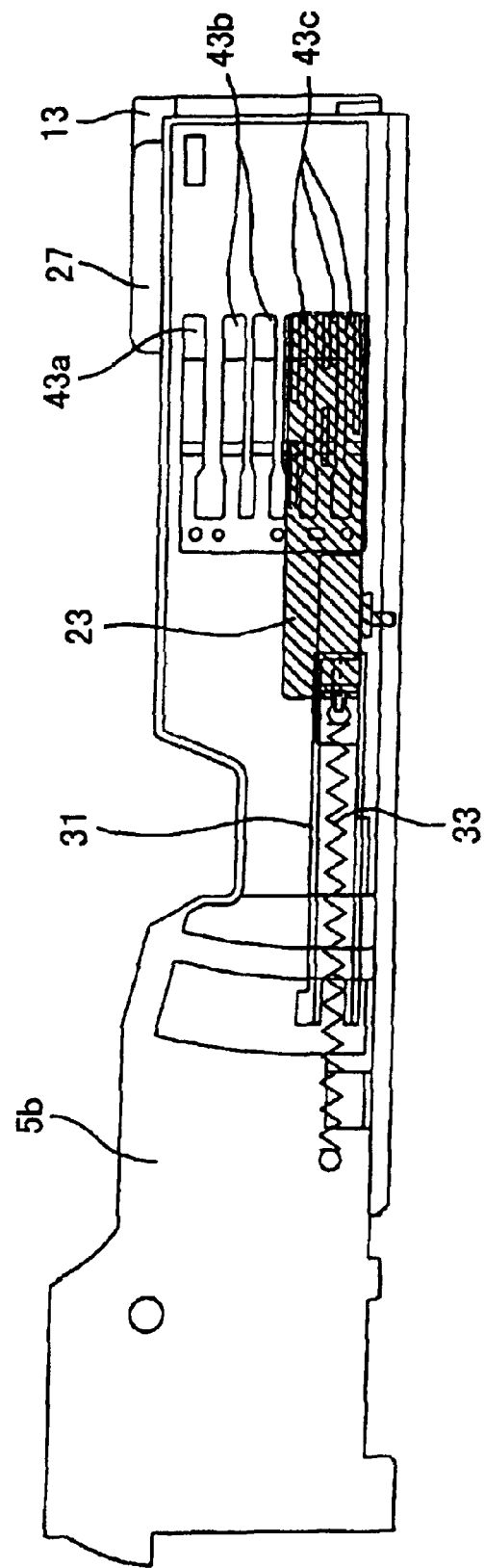
FIG. 10 is a front view showing configuration of the laser printer for pulling the first slider when the sheet-supply cassette is mounted in the laser printer as in FIG. 3.

Next, further description of the printer 1 will be provided. The engagement portion 31 is provided on the chassis 44 of the laser printer 1 so as to be movable leftward and rightward. As shown in FIG. 3 and 10, the engagement portion 31 includes an integral tip 31a that protrudes toward the sheet-supply cassette 2. The pulling spring 33 is attached to the engagement portion 31. The pulling spring 33 has a pulling force larger than that of the pulling spring 19. As shown in FIG. 6, lowermost set of springs 43c includes three springs to match the three indention/protrusion rows 24, 25, 26. The sensors S4, S5, and S6 are disposed in vertical alignment on the laser printer 1 at positions that correspond to the plate springs 43c.

when the sheet-supply cassette 2 is inserted into the printer, the engaged portion 23d of the first slider 23 engages with the tip 31a of the engagement portion 31 and moves leftward as shown in FIGS. 3 and 10. The engaged portion 23d can be easily moved because it is at least partially exposed from an outer wall 5b of the sheet-supply cassette 2. Movement of the engaged portion 23d pulls the first slider 23 leftward as shown in FIGS. 3 and 10 and moves the cam 17 accordingly Said differently, the engagement portion 31 moved the cam 17 by moving the first slider 23 via the engaged portion 23d.

Because the pulling spring 33 has a pulling force larger than that of the pulling spring 19, this leftward movement of the first slider 23 pivots the cam 17 in the clockwise direction against the urging force of the pulling spring 19. The cam 17 pivots from the separated position until one of the five step surfaces 18a to 18e of the cam surface 17a abuts against the boss 21. Once the cam surface 17a abuts the boss 21, the pulling spring 33 extends until the sheet-supply cassette 2 moves to the proper position in the laser printer 1. In this way, the pulling spring 33 serves as an absorber that absorbs excess force from the engagement portion 31 beyond movement required to abut the cam 17 against the boss 21. With this configuration, the cam 17 can be reliably abutted against the boss 21 and the sheet-supply cassette 2 can be mounted into the laser printer 1 without interference, but no excessive load is applied to the cam 17 or the boss 21.

The first slider 23 moves linearly following the movement direction in which the sheet-supply cassette 2 moves when the sheet-supply cassette 2 is being attached to and detached from the main body 1. With this configuration, the engagement portion 31 can be made with a simple configuration. That is, in contrast, it is conceivable to form the portion detected by the printer as a cylindrical member that rotates in accordance with movement of the guides 7a, 7b, wherein the size of the sheets is detected by the amount that the cylindrical member rotates. With such a configuration, configuration needs to be provided that converts linear movement of the sheet cassette into rotation of the cylindrical member. No such configuration is required in the present embodiment because the first slider 23 moves linearly following the movement direction of the sheet-supply cassette 2. Also, with a cylindrical member, because the different sized-sheets are indicated using the cylinder's periphery, the number of different sized sheets that could be indicated on the cylindrical member is limited by the peripheral size of the cylinder On the other hand, because the first slider 23 is a linearly moving member, the limit to the number of different sized sheets indicatable by the first slider 23 can be increased by merely increasing the length of the slider 23.

Which of the step surface 18a to 18e abuts against the boss 21 depends on the proximity of the boss 21 to the pivot axis P. The proximity of the boss 21 to the pivot axis P depends on the position of the guide 7b. In this way, the pivoting amount and position of the cam 17 is regulated in a step-like manner by the cam surface 17a engaging with the boss 21. The following table shows which step surface is abutted by the boss 21 when the guide 7b is aligned for different sheet types.

TABLE 1

| TYPE OF SHEET INTERPOSED BETWEEN GUIDES 7a, 7b | STEP SURFACE ABUTTED BY BOSS 21 |
| --- | --- |
| A6 size sheets | surface 18a |
| B6 size sheets | surface 18b |
| A5 size sheets | surface 18c |
| B5 and executive size sheets | surface 18d |
| A4, letter, and legal size sheets | surface 18e |

When a protrusion of the first slider 23 moves into alignment with one of the springs 43c, then the spring 43c is pressed away from the sheet-supply cassette 2 by the protrusion and turns the corresponding sensor on. In this way, the protrusions on the first slider 23 selectively press the plate springs 43c against corresponding ones of sensors S4, S5, and S6, turning the corresponding sensors into an on condition. Contrarily, plate springs 43c that are aligned with indentations of the first slider 23 are not pressed against a sensor, so the corresponding sensors remain in an off condition. FIG. 3 shows the protrusion 24a of the first slider 23 pressing the uppermost plate spring 43c the uppermost sensor S4 into an on condition.

Because the protrusions and indentations are positioned differently in each row 24, 25, 26, the springs 43c are pressed down, or not pressed down, in patterns that differ depending on the movement amount, that is, the position, of the first slider 23. Because the cam 17 and the first slider 23 are linked together, the movement amount of the slider 23 depends on the position of the guide 7b, that is, on the size of sheet sandwiched between the guides 7a, 7b. Therefore, the laser printer 1 can detect the size of the sheets based on the different on/off patterns from the sensors S4, S5, S6. With this configuration, the movement amount of the first slider 23 can be mechanically detected. Therefore the size of sheets can be detected using simple processes.

Here, FIGS. 3 and 4 will be compared. As shown in FIG. 3, the cam surface 17a is in abutment with the boss 21 when the sheet-supply cassette 2 is mounted into the laser printer 1, because the engaging portion 31 slid the first slider 23 leftward and the cam 17 pivoted clockwise accordingly. As shown in FIG. 4, when the sheet-supply cassette 2 is removed from the laser printer 1, the boss 21 and the cam 17 are separated from each other. Therefore, when the guides 7a, 7b are moved to abut against side edges of sheets stacked in the sheet-supply cassette 2, the cam 17 will not move and the first slider 23 will not move. The guides 7a, 7b can be moved easily because only the guides 7a, 7b move, and there is no need to move the cam 17, the first slider 23, and other interposed configuration when moving the guides 7a, 7b.

When a protrusion on the first slider 23 presses against one of the plate springs 43c, the protrusion itself receives pressing force from the spring 43c. If the side wall 5b bends inward, that is, to the rear, under this pressing force, there is a potential that the sensors S4 to S6 might not turn on properly This potential increases with the number of plate springs 43c and with increase in strength of urging force of each plate spring 43c. Also, amount that the side wall 5b bends increases with distance of the protrusions and springs from the base 3, so that the sensors that correspond to the uppermost protrusion are more likely to make incorrect detections.

Figure 11:
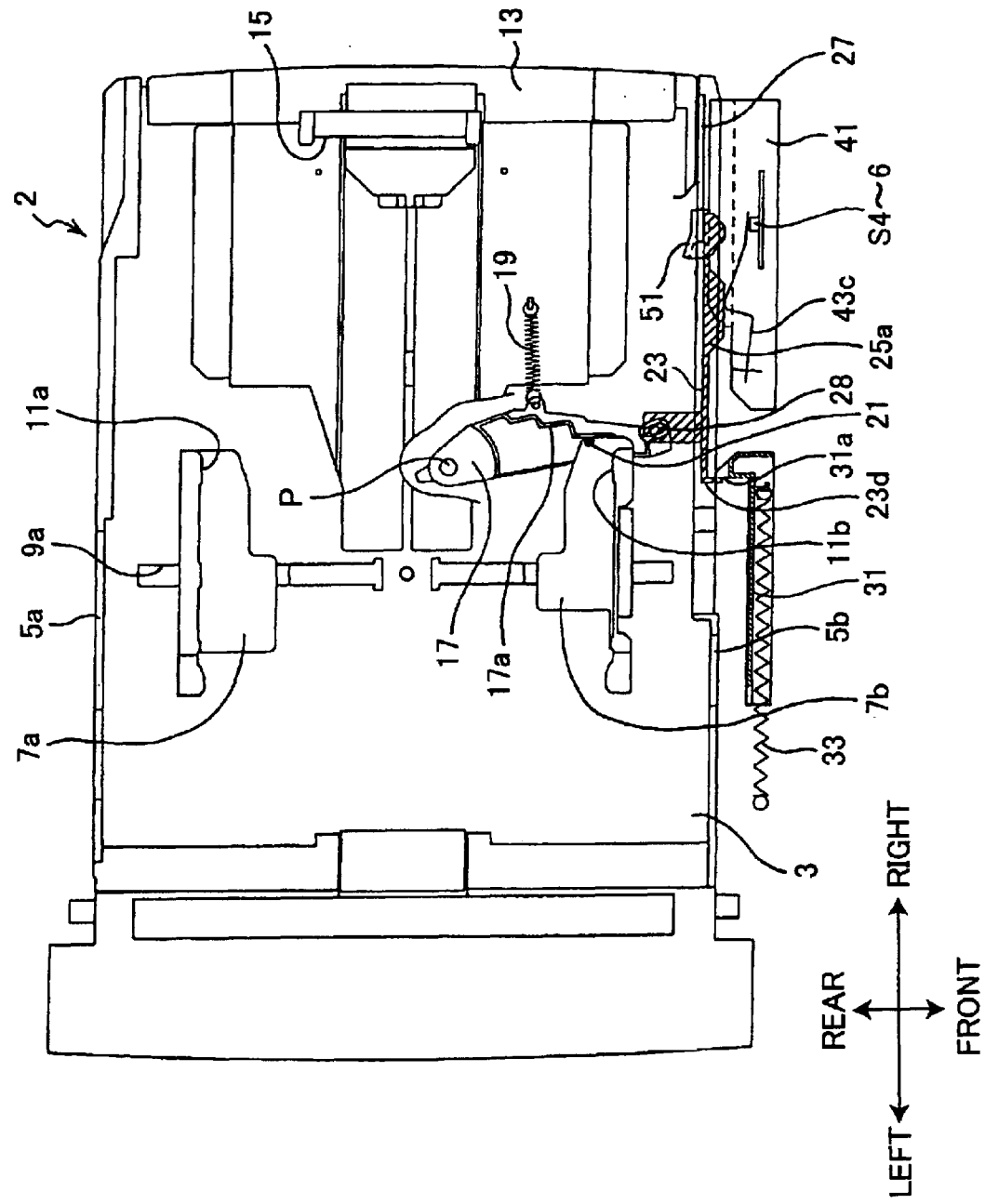
FIG. 11 is a plan view showing the sheet-supply cassette of FIG. 3, but taken from a higher position to include a side wall support.

Here, configuration of the printer 1 and the sheet-supply cassette 2 for preventing the side wall 5b from bending inward will be described. As shown in FIGS. 11 and 12, the front cassette holder 41 is provided with an extension portion 41b at the upper end and a guide portion 41a at the lower end. It should be noted that, although not shown in the drawings, the rear cassette has substantially the same configuration as the front cassette holder 41 so its description will be omitted to avoid redundant explanation.

The guide portion 41a engages with a positioning step 3a provided on the upper edge of the side wall 3. The extension portion 41b extends above the side wall 5b and is formed with a groove 41c and an integral support portion 51. When the sheet-supply cassette 2 is inserted into the laser printer 1, the groove 41c engages with a rib 27 formed on the upper edge of the side wall 5b. When the plate springs 43c press against protrusions on the first slider 23, the support portion 51 supports the side wall 5b from behind the rib 27 so that the side wall 5b will not bend inward. As a result, the sensors S4 to S6 will always properly detect the protrusions on the first slider 23.

The side wall 5b will tend to bend at the free end under the load of the plate springs 43c. This bending is effectively prevented using a very simple configuration because the support portion 51 supports the free end of the side wall 5b, which is the side of the side wall 5b opposite from the base 3 with the first slider 23 sandwiched therebetween. Also, the support portion 51 can be compact in size because only a small load compared to the load from the first slider 23 is sufficient for preventing the side wall 5b from bending.

It should be noted that the side wall 5b is more likely to bend when the extension tray 13b is in the expansion position. However, the side wall 5b is prevented from bending because the support portion 51 supports the rib 27 at the upper edge of the side wall 5b. Because the rib 27 is further from the base 3 than the portion of the extension tray 13b that is nearest the rib 27, the support portion 51 can Support the side wall 5b easily without interfering with movement of the sheet-supply cassette 2 when the sheet-supply cassette 2 is mounted.

Figure 13:
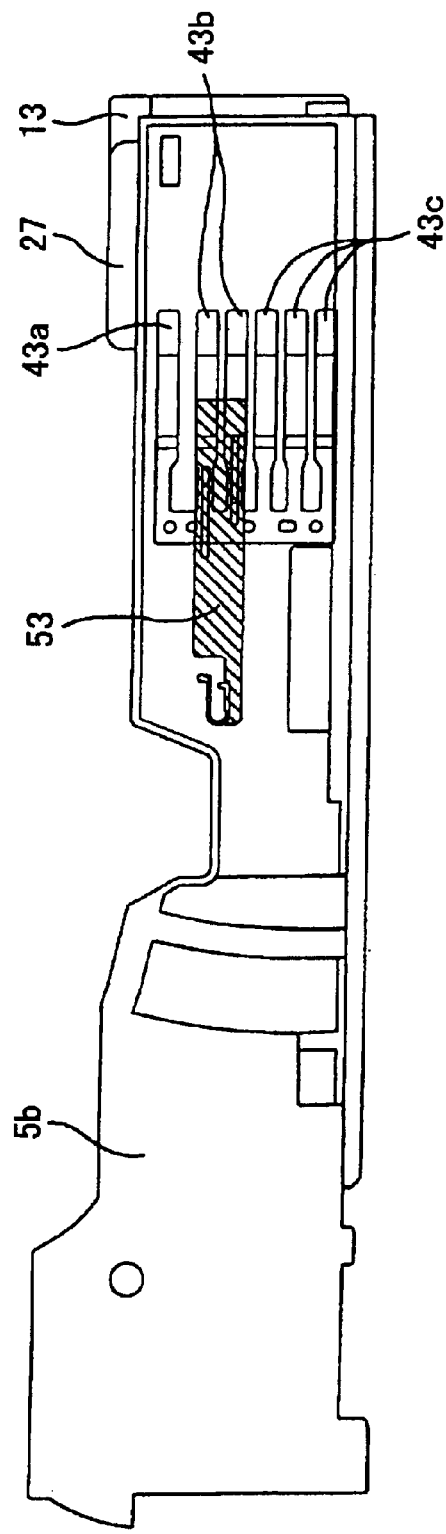
FIG. 13 is a front view showing the second slider attached to the sheet-supply cassette.

Next, an explanation will be provided for the second slider 53. As shown in FIG. 13, the second slider 53 is located above the first slider 23 at a position on the side wall 5b that corresponds with position of the spring plates 43b.

Figure 14:
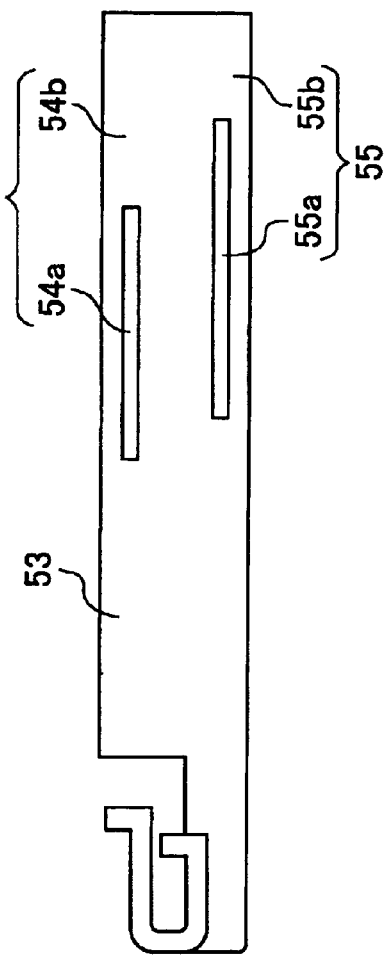
FIG. 14 is a plan view showing details of the second slider.
Figure 15:
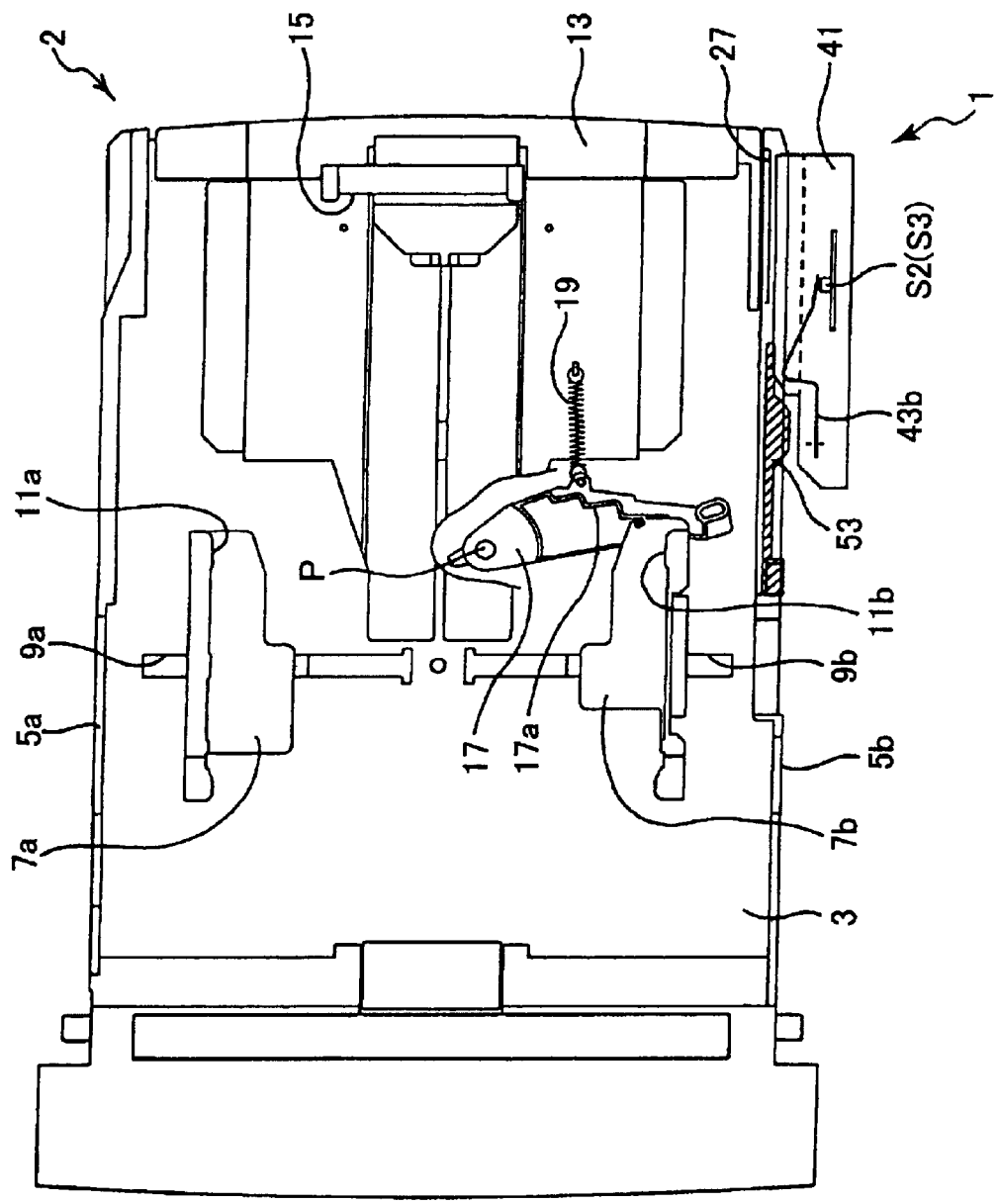
FIG. 15 is a plan view showing the position of the second slider when the sheet-supply cassette mounted in laser printer.

As shown in FIG. 14, the second slider 53 is formed with two protrusion/indentation rows 54, 55. The protrusion/indentation row 54 includes a protrusion 54a and an indentation 54b and the protrusion/indentation row 55 includes a protrusion 55a and an indentation 55b. It should be noted that the second slider 53 does not actually slide, but instead is detachable from the sheet-supply cassette 2 as mentioned above. A plurality of different second sliders 53 are provided, each with a different pattern of protrusions. FIG. 13 shows one of the second sliders 53 attached to the sheet-supply cassette 2. The two springs 43b are provided at positions that correspond to the positions of the two protrusion/indentation rows 54, 55. As shown in FIG. 15, the two sensors S2, S3 are provided in association with the two springs 43b. The second slider 53 is used by the laser printer 1 to distinguish the sheet-supply cassette 2 from other sheet-supply cassettes using a method similar in principal to the method of detecting size of the sheets explained above. That is, as shown in FIG. 15, the springs 43b render the sensors S2, S3 on when the protrusions on the second slider 53 press against one of the springs 43b. The laser printer 1 distinguishes the sheet-supply cassette 2 from other sheet-supply cassettes based on the on/off pattern from the sensors 2, 3.

Figure 16:
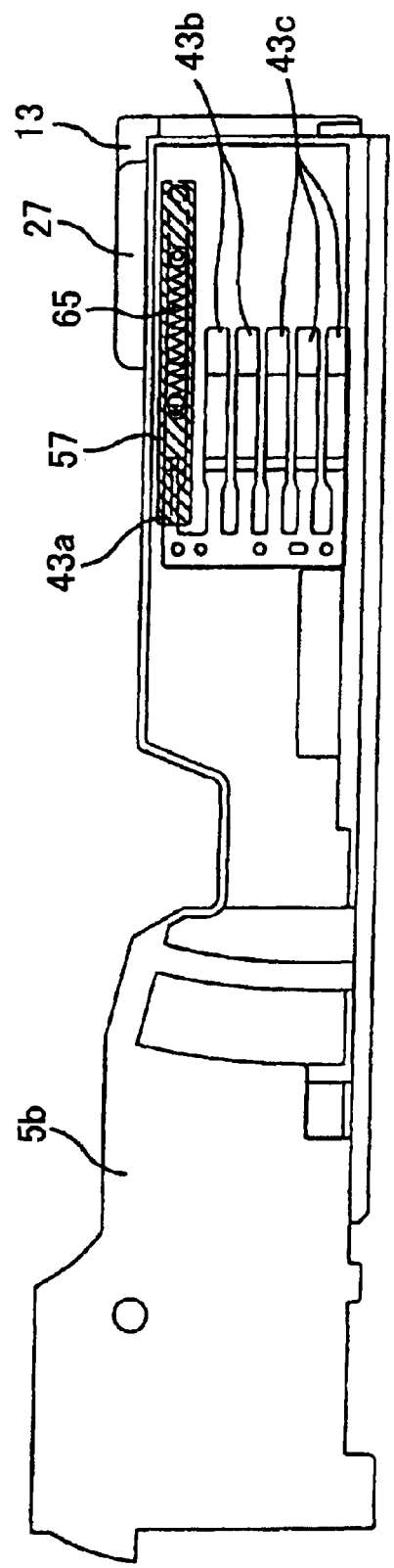
FIG. 16 is a side view showing the third slider when an extension tray of the sheet-supply cassette is retracted.
Figure 17:
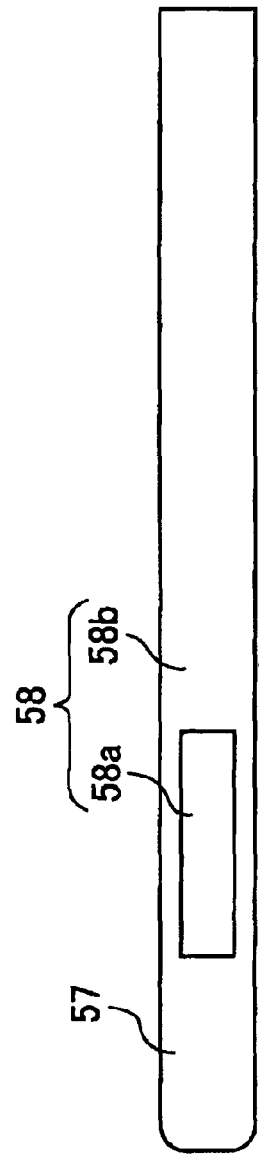
FIG. 17 is a plan view showing details of the third slider.
Figure 18:
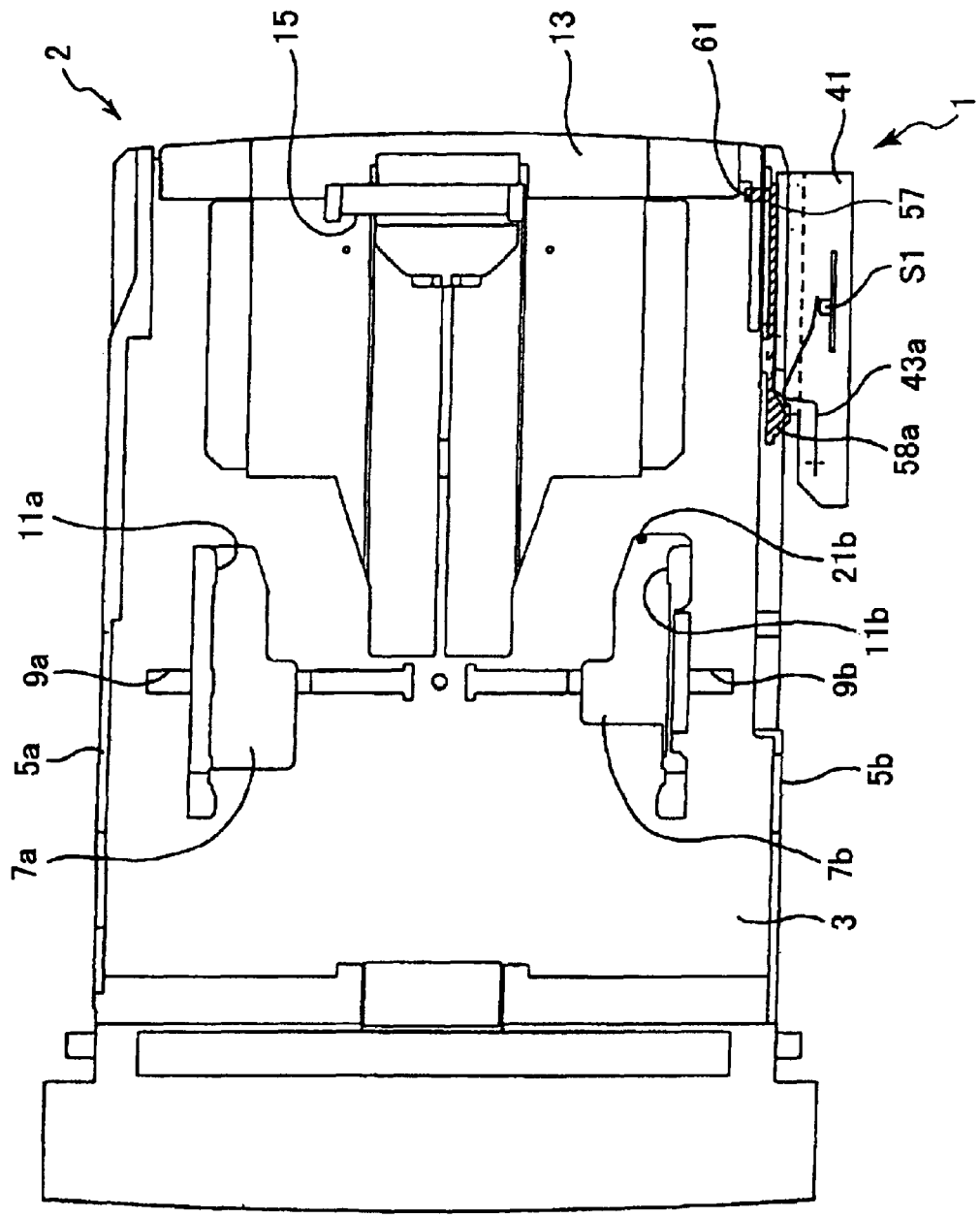
FIG. 18 is a plan showing the third slider when the extension tray of the sheet-supply cassette is retracted.

Next, an explanation will be provided for the third slider 57. As shown in FIG. 16, the third slider 57 is located above the second slider 53 at a position on the side wall 5b that corresponds with position of the plate spring 43a. The third slider 57 moves leftward and rightward in association with extension and retraction of the extension tray 13 and is used to indicate to the laser printer 1 whether the sheet stored in the sheet-supply cassette 2 is a long sheet, such as a legal sized sheet. As shown in FIG. 17, the third slider 57 includes a single protrusion/indentation row 58 formed from a protrusion 58a and an indentation 58b. FIG. 16 and 18 show the positions of the extension tray 13 and the third slider 57 when normal length sheets, such as A4 size and letter sized sheets, are stacked in the sheet-supply cassette 2. At this time, the third slider 57 is positioned at the leftmost position, because the extension tray 13 is fully retracted. As a result, the protrusion 58a formed on the third slider 57 does not press on the plate spring 43a, so the sensor S1 remains in an off condition. The laser printer 1 detects that normal length sheets are stacked in the sheet-supply cassette 2.

A compression spring 65 is interposed between the third slider 57 and the side wall 5b. The compression spring 65 urges the third slider 57 rightward. A boss 61 is provided on the third slider 57. When the extension tray 13 is retracted as shown in FIGS. 16 and 18, the extension tray 13 presses the boss 61 to maintain the third slider 57 into its leftmost position against the urging force of the compression spring 65.

Figure 19:
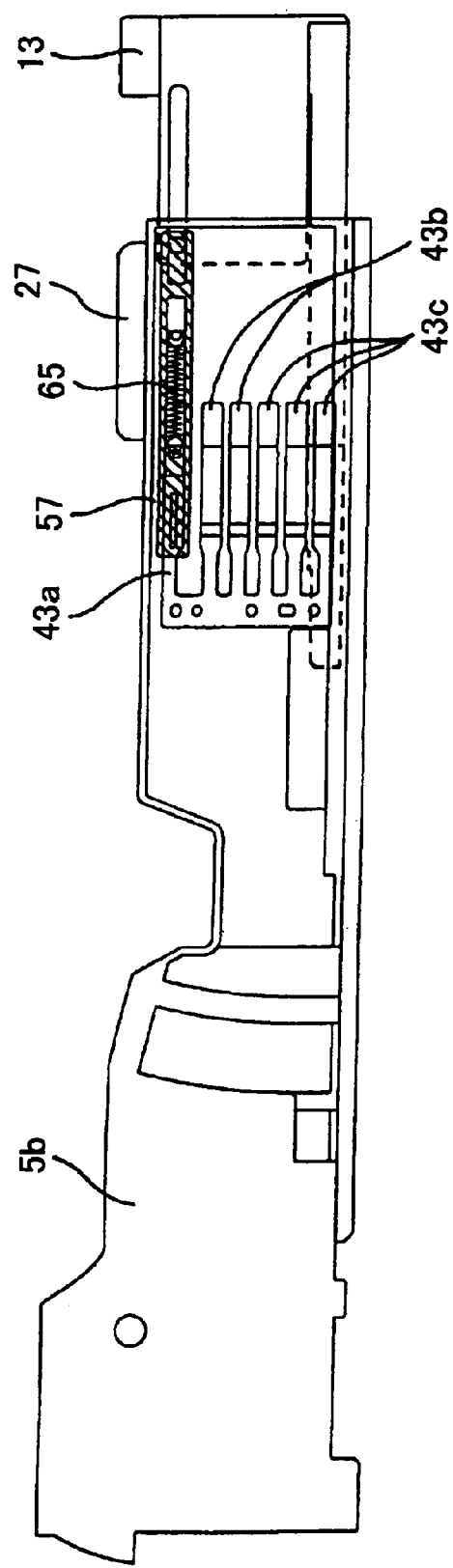
FIG. 19 is a side view showing the third slider when the extension tray of the sheet-supply cassette is pulled out to house legal size sheets.
Figure 20:
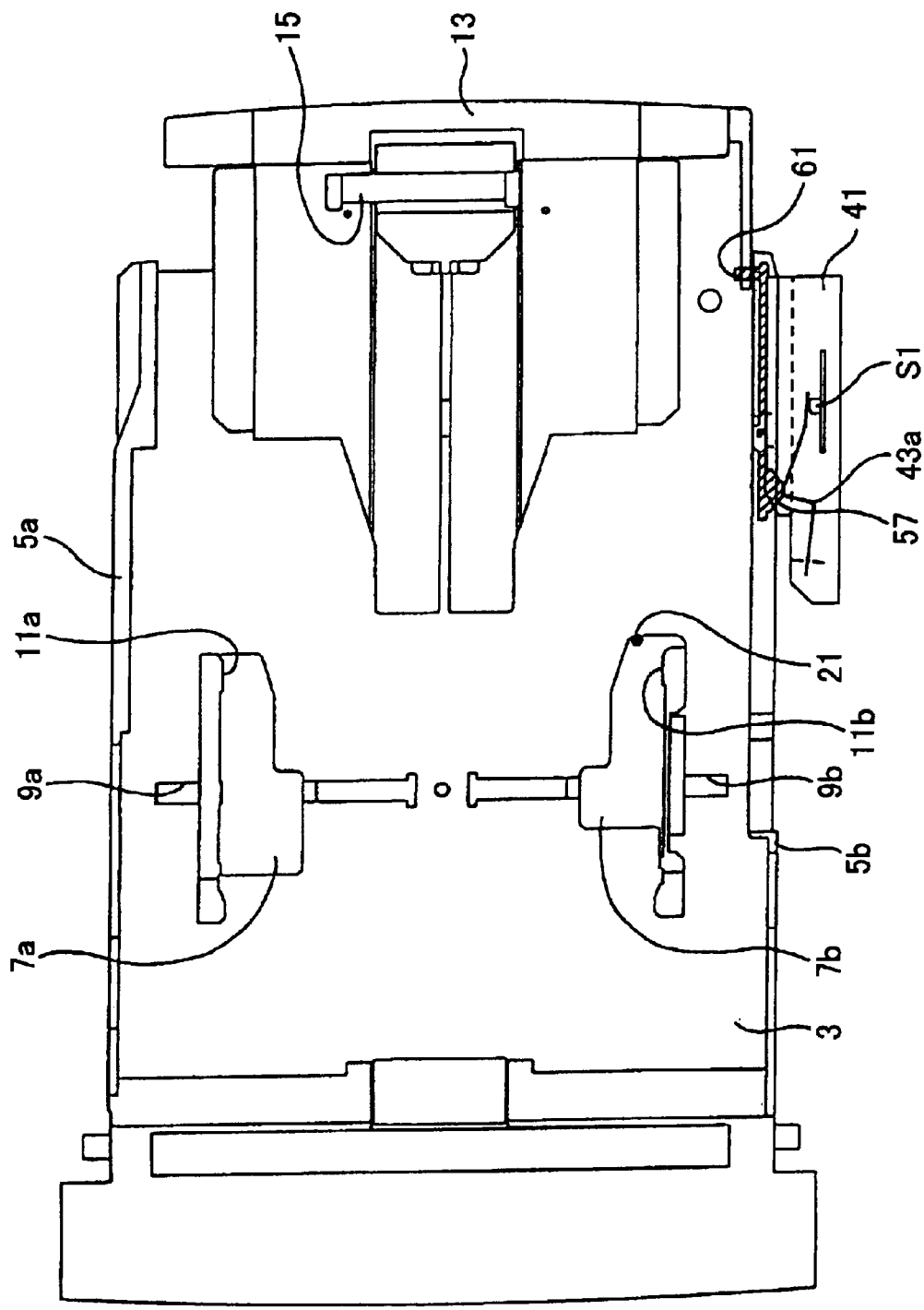
FIG. 20 is a plan showing the third slider when the extension tray of the sheet-supply cassette is pulled out to house legal size sheets.

When the extension tray 13 is drawn out rightward as shown in FIGS. 19 and 20 to support legal sized sheets, the boss 61 is released from the pressing force of the extension tray 13. Therefore, the third slider 57 slides rightward under the urging force of the compression spring 65. As a result, the protrusion 58a on the third slider 57 presses against the plate spring 43a so that the sensor SI is turned on. With this configuration, the laser printer can detect that long sheets, such as legal sized sheets, are stored in the sheet-supply cassette 2. With this configuration, the laser printer 1 can properly detect the type of sheet in the sheet-supply cassette 2 based on the on/off pattern from the sensor S1, even when different type sheets have the same width like letter sized and legal sized sheets.

Letter sized and A4 sized sheets differ in width by only a few millimeters. B5 sized and executive sized sheets also differ in width by only a few millimeters. Therefore, with these sheet types, there is a danger that detection of sheet type will be incorrect if based only on the movement amount of the guides 7a, 7b. However, the laser printer 1 determines sheet size based on size data send from the personal computer 75 connected to the laser printer 1.

The personal computer 75 sends character data or other image data to the printer 1 and also size data, as a parameter indicating size, along with the image data. When the CPU 79 judges, based on the output from the sensors S4 to S6 that the sheet in the sheet-supply cassette 2 is an A4 or letter sized sheet, or a B5 size or an executive size, then the CPU 79 judges the size of sheets in the sheet-supply cassette 2 based on the size data from the personal computer 75. Accordingly, the laser printer 1 can properly judge whether sheets housed in the sheet-supply cassette 2 are one or the other of sheets that have substantially the same width.

As described above, the sheet-supply cassette 2 is provided with three sliders: the first slider 23 and the third slider 57 for indicating the size of housed sheets to the laser printer and the second slider 53 for indicating distinction information about the sheet-supply cassette 2 to the laser printer 1. According to the embodiment, the sliders 23, 53, 57 are concentrated in a single area, and are no distributed at various positions on the sheet-supply cassette 2, such as, the first slider 23 being positioned as described above but the second slider 53 being positioned to the left side of the side wall 5b. Because the sliders 23, 53, 57 are concentrated in a single area, the plate springs 43a to 43c and the sensors S1 to S6 can be provided to the laser printer concentrated in a single area also. By concentrating components in this manner, the plate springs 43a–43c exert a large pressing force in the direction perpendicular to the side wall 5b. This large external force urges the side wall 5b to bend inward. However, the side wall support portion 51 supports the side wall 5b from the top portion of the side wall 5b, so less load is placed on the side wall support portion 51 than if the side wall support portion 51 supported the side wall 5*b* from a position nearer the base 3. Because the side wall support portion 51 properly prevents the side wall 5*b* from bending, the plate springs 43*a* to 43*c* require a smaller pressing force to activate the switches. Accordingly, the side wall support portion 51 does not need to be very strong. As a result, the laser printer can be made smaller. Also, because sliders are provided in a plurality that depends on information to be indicated and the plate springs 43*a* to 43*c* are provided in a plurality that corresponds to the plurality of sliders, information can be transmitted to the image forming device in an amount depending on the number of sliders.

When the rib 27 enters into the groove 41*c*, the side wall support portion 51 supports the rib 27 from inside the sheet-supply cassette 2. Therefore, the side wall 5*b* will not bend even if the plate spring 43*c* presses against the first slider 23. The sensors S4 to S6 will properly detect the size of sheets. In the same manner, the sensor S1 will properly detected whether a legal-sized sheet is housed in the sheet-supply cassette 2 and the sensors S2, 53 will properly distinguish between different sheet-supply cassettes 1.

While the invention has been described in detail with reference to specific embodiments thereof, it would be apparent to those skilled in the art that various changes and modifications may be made therein without departing from the spirit of the invention, the scope of which is defined by the attached claims.

Figure 21:
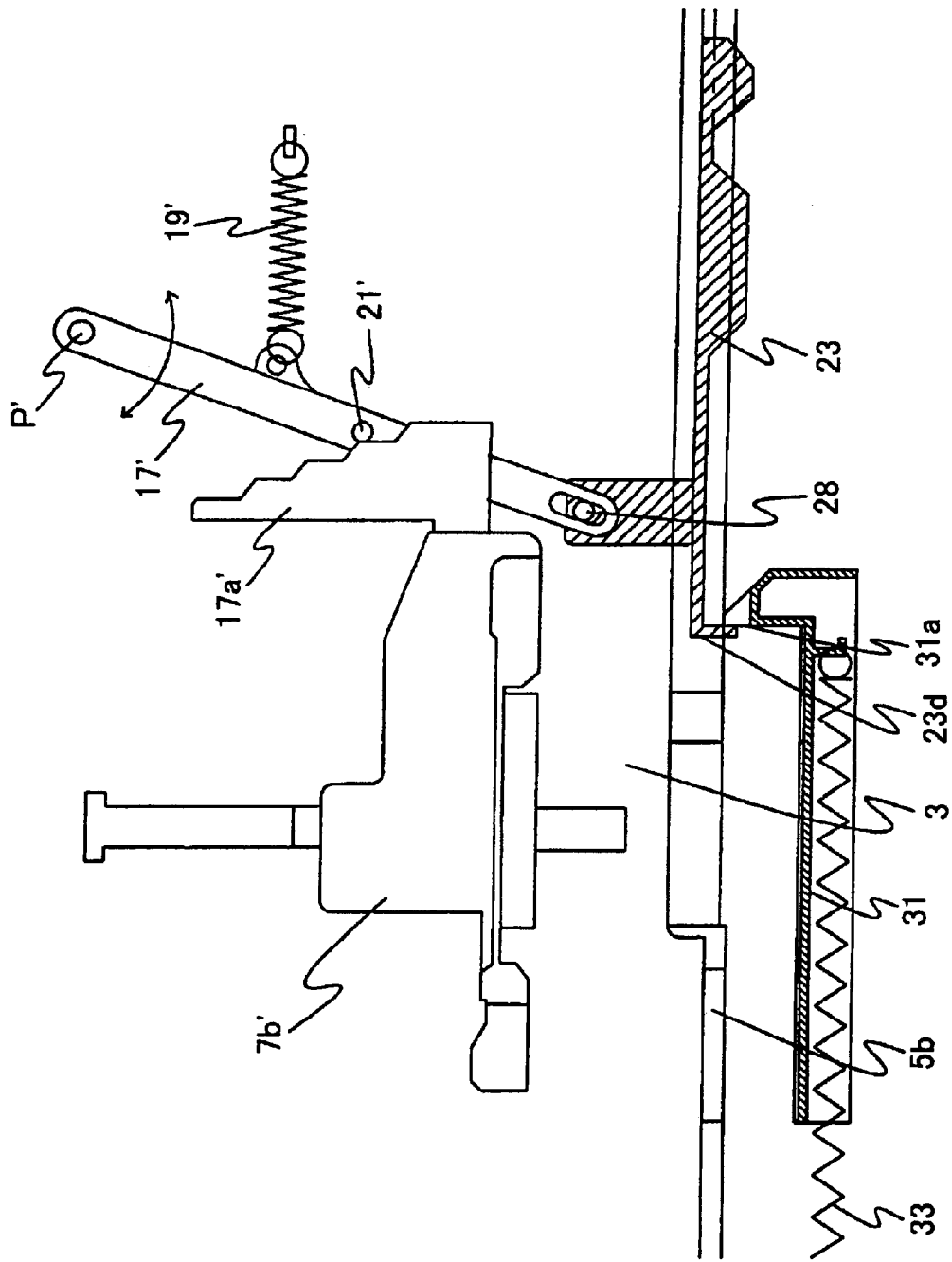
FIG. 21 is a schematic view showing a modification of the embodiment.

For example, the embodiment described that the boss 21 is provided on one of the guides 7*a*, 7*b* and that cam 17*a* is provided on a lever 17 so as to abut the boss 21 when the lever 17 pivots. However, as shown in FIG. 21 a cam 17*a*' could be provided on a guide 7*b*' and a boss 21' can be provided on a link 17' so that the boss 21' abuts against the cam 17*a*' when the link 17' pivots. It should be noted that in FIG. 21, like components from the embodiment are designated with the same numbering to avoid duplication of description. In this modification, the cam 17*a*' is provided integrally on the guide 7*b*'. The link 17' is provided pivotally about a shaft P' provided in an upright posture on the base 3. The boss 21' is provided on the link 17', with an upright posture oriented parallel with the shaft P'. A spring 19' is provided for urging the link 17' in the counterclockwise direction as viewed in FIG. 21 to put the boss 21' in a separated position from the cam 17*a*' when the sheet-Supply cassette is removed from the laser printer With the configuration of this modification also, the guides 7*b*' can be easily moved when the sheet-supply cassette is removed from the laser printer.

Also, the embodiment described a mechanical configuration of plate springs 43*c* and sensors S4 to S6 for detecting the protrusion and indentation patterns formed on the first slider 23 to indicate the size of sheet to the laser printer 1. However, any other configuration that enables the laser printer 1 to detect sheet size can be used instead. For example, the protrusions and indentations can be removed from the first slider 23 and replaced with a bar code or other optically readable symbol. In this case a bar code reader or other reading unit can be provided to the laser printer 1. In this case, a plurality of bar codes are aligned following the movement direction of the first slider 23. As a result, the bar code reader of the laser printer will read a different bar code depending on the movement amount of the first slider Instead of this type of optical detection, magnetic tape can be placed on appropriate positions of the first slider 23 and magnetically detected by a magnetic head and the like disposed on the laser printer 1.

Although the embodiment described the present invention applied to a sheet-supply cassette used in a laser printer, the present invention can be applied to any image forming device, such as ink jet printers, facsimile machines, copy machines, and the like. Also, the present invention can be applied to a sheet-supply device for supplying sheets to an image forming device that is separate and independent from the image forming device. Also, conductors can be provided on the first slider 23 and electrodes can be provided on the laser printer 1. The conductors on the first slider 23 contact the electrodes and electrically detect the type of sheet based on whether a circuit is formed or not.

What is claimed is:

1. An image forming device for forming images on sheets, the image forming device comprising:
    a main body and a sheet-supply cassette attachable to and detachable from the main body,
    the sheet-supply cassette including:
        a guide that guides edges of sheets housed in the sheet-supply cassette, the guide being movable to change position in accordance with size of housed sheets;
        a cam abutment portion that moves to a position that corresponds to the position of the guide;
        a cam with a cam surface, the cam movable so that the cam surface selectively moves toward and away from the cam abutment portion, the cam moving to a separated position, wherein the cam surface is separated from the cam abutment portion, when the sheet-supply cassette is detached from the main body; and
        a detected portion that moves in a linked manner with the cam; and
    the main body including:
        a cam mover that, when the sheet-supply cassette is attached to the main body, moves the cam until the cam surface of the cam abuts the cam abutment portion; and
        a detection portion that detects the detected portion moved in a linked manner with the cam;
    wherein the cam surface has a shape that varies movement amount of the cam into abutment with the abutment portion by the cam mover in accordance with the position of the guide.

2. An image forming device as claimed in claim 1, wherein the sheet-supply cassette further includes a cam urger that urges the cam into the separated position, the cam mover abutting the cam against the cam abutment portion against resistance from the cam urger.

3. An image forming device as claimed in claim 1, further comprising an absorber that absorbs excess force from the cam mover beyond movement required to abut the cam against the cam abutment portion.

4. An image forming device as claimed in claim 3, wherein the detected portion includes an engagement portion that is exposed from an outer wall of the sheet-supply cassette, the engagement portion engaging with the cam mover when the sheet-supply cassette is attached to the main body.

5. An image forming device as claimed in claim 1, wherein the detected portion moves linearly following a movement direction in which the sheet-supply cassette moves when the sheet-supply cassette is being attached to and detached from the main body.

6. An image forming device as claimed in claim 1, wherein the detected portion includes an engagement portion that is exposed from an outer wall of the sheet-supply cassette, the engagement portion engaging with the cam mover when the sheet-supply cassette is attached to the main body.

7. An image forming device as claimed in claim 1, wherein:
the detected portion is formed with a plurality of protrusions aligned in a movement direction of the sheet-supply cassette when the sheet-supply cassette is being attached to and detached from the main body, the plurality of protrusions being formed in patterns that differ depending on position in the movement direction; and
the detection portion includes a plurality of switches that turn selectively on and off in accordance with presence and absence of the protrusions, the detention portion detecting movement amount of the detected portion based on on/off pattern of the switches.

8. An image forming device as claimed in claim 1, wherein:
the sheet-supply cassette further includes a cassette body having at least a base and a pair of side walls extending from the base, the detected portion being provided on at least one of the side walls, the detected portion indicating at least one of information relating to sheets housed in the cassette body and information relating the cassette body;
the detection portion has:
a pressing portion that, when the sheet-supply cassette is mounted in the main body, presses the detected portion against the at least one side wall in a direction perpendicular to direction in which the side wall extends from the base; and
an information detection portion that receives repulsive force from the pressing portion pressing against the detected portion and that detects the information indicated by the detected portion based on the repulsive force; and
the main body further includes a side wall support that supports the at least one side wall from bending under pressing force of the pressing portion against the detected portion.

9. An image forming device for forming images on sheets, the image forming device comprising:
a main body and a sheet-supply cassette attachable to and detachable from the main body,
the sheet-supply cassette including:
a guide that guides edges of sheets housed in the sheet-supply cassette, the guide being movable to change position in accordance with size of housed sheets;
a guide cam that changes position integrally with the guide, the guide cam having a cam surface;
a guide cam abutment portion movable selectively toward and away from the guide cam, the guide cam abutment portion moving to a separated position separated from the guide cam when the sheet-supply cassette is detached from the main body; and
a detected portion that moves in a linked manner with the guide cam abutment portion; and
the main body including:
an abutment portion mover that, when the sheet-supply cassette is attached to the main body, moves the guide cam abutment portion until the guide cam abutment portion abuts the can surface of the guide cam; and
a detection portion that detects the detected portion moved in a linked manner with the guide cam abutment portion;
wherein the cam surface of the guide cam has a shape that varies movement amount of guide cam abutment portion into abutment with the cam surface by the abutment portion mover in accordance with the position of the guide.

10. An image forming device as claimed in claim 9, wherein the sheet-supply cassette further includes an abutment portion urging means that urges the guide cam abutment portion into the separated position, the abutment portion mover moving the guide cam abutment portion into abutment with the cam surface against urging force of the abutment portion urging means.

11. An image forming device as claimed in claim 9, further comprising an absorber that absorbs excess force from the cam mover beyond movement required to abut the cam against the cam abutment portion.

12. An image forming device as claimed in claim 11, wherein the detected portion includes an engagement portion that is exposed from an outer wall of the sheet-supply cassette, the engagement portion engaging with the abutment portion mover when the sheet-supply cassette is attached to the main body.

13. An image forming device as claimed in claim 9, wherein the detected portion moves linearly following a movement direction in which the sheet-supply cassette moves when the sheet-supply cassette is being attached to and detached from the main body.

14. An image forming device as claimed in claim 9, wherein the detected portion includes an engagement portion that is exposed from an outer wall of the sheet-supply cassette, the engagement portion engaging with the abutment portion mover when the sheet-supply cassette is attached to the main body.

15. An image forming device as claimed in claim 9, wherein:
the detected portion is formed with a plurality of protrusions aligned in a movement direction in which the sheet-supply cassette moves when the sheet-supply cassette is being attached to and detached from the main body, the plurality of protrusions being formed in patterns that differ depending on position in the movement direction; and
the detection portion includes a plurality of switches that turn selectively on and off in accordance with presence and absence of the protrusions, the detection portion detecting movement amount of the detected portion based on on/off pattern of the switches.

16. An image forming device as claimed in claim 9, wherein:
the sheet-supply cassette further includes a cassette body having at least a base and a pair of side walls extending from the base, the detected portion being provided on at least one of the side walls, the detected portion indicating at least one of information relating to sheets housed in the cassette body and information relating the cassette body;
the detection portion has:
a pressing portion that, when the sheet-supply cassette is mounted in the main body, presses the detected portion against the at least one side wall in a direction perpendicular to direction in which the side wall extends from the base; and
an information detection portion that receives repulsive force from the pressing portion pressing against the detected portion and that detects the information indicated by the detected portion based on the repulsive force; and the main body further includes a side wall support that supports the at least one side wall from bending under pressing force of the pressing portion against the detected portion.

17. A sheet-supply device for supplying sheets, the sheet-supply device comprising:
a main body and a sheet-supply cassette attachable to and detachable from the main body,
the sheet-supply cassette including:
a guide that guides edges of sheets housed in the sheet-supply cassette, the guide being movable to change position in accordance with size of housed sheets;
a cam abutment portion that moves to a position that corresponds to the position of the guide;
a cam with a cam surface, the cam movable so that the cam surface selectively moves toward and away from the cam abutment portion, the cam moving to a separated position, wherein the cam surface is separated from the cam abutment portion, when the sheet-supply cassette is detached from the main body; and
a detected portion that moves in a linked manner with the cam; and
the main body including:
a cam mover that, when the sheet-supply cassette is attached to the main body, moves the cam until the cam surface of the cam abuts the cam abutment portion; and
a detection portion that detects the detected portion moved in a linked manner with the cam;
wherein the cam surface has a shape that varies movement amount of the cam into abutment with the abutment portion by the cam mover in accordance with the position of the guide.

18. A sheet-supply device as claimed in claim 17, wherein the sheet-supply cassette further includes a cam urger that urges the cam into the separated position, the cam mover abutting the cam against the cam abutment portion against resistance from the cam urger.

19. A sheet-supply device as claimed in claim 17, further comprising an absorber that absorbs excess force from the cam mover beyond movement required to abut the cam against the cam abutment portion.

20. A sheet-supply device as claimed in claim 19, wherein the detected portion includes an engagement portion that is exposed from an outer wall of the sheet-supply cassette, the engagement portion engaging with the cam mover when the sheet-supply cassette is attached to the main body.

21. A sheet-supply device as claimed in claim 17, wherein the detected portion moves linearly following a movement direction in which the sheet-supply cassette moves when the sheet-supply cassette is being attached to and detached from the main body.

22. A sheet-supply device as claimed in claim 17, wherein the detected portion includes an engagement portion that is exposed from an outer wall of the sheet-supply cassette, the engagement portion engaging with the cam mover when the sheet-supply cassette is attached to the main body.

23. A sheet-supply device as claimed in claim 17, wherein:
the detected portion is formed with a plurality of protrusions aligned in a movement direction of the sheet-supply cassette when the sheet-supply cassette is being attached to and detached from the main body, the plurality of protrusions being formed in patterns that differ depending on position in the movement direction; and the detection portion includes a plurality of switches that turn selectively on and off in accordance with presence and absence of the protrusions, the detection portion detecting movement amount of the detected portion based on on/off pattern of the switches.

24. A sheet-supply device as claimed in claim 17, further comprising:
a sheet-supply unit for supplying sheets out from the sheet-supply cassette; and
an image forming unit for forming images on the sheets supplied by the sheet-supply unit.

25. As sheet supply device as claimed in claim 17, wherein:
the sheet-supply cassette further includes a cassette body having at least a base and a pair of side walls extending from the base, the detected portion being provided on at least one of the side walls, the detected portion indicating at least one of information relating to sheets housed in the cassette body and information relating the cassette body;
the detection portion has:
a pressing portion that, when the sheet-supply cassette is mounted in the main body, presses the detected portion against the at least one side wall in a direction perpendicular to direction in which the side wall extends from the base; and
an information detection portion that receives repulsive force from the pressing portion pressing against the detected portion and that detects the information indicated by the detected portion based on the repulsive force; and
the main body further includes a side wall support that supports the at least one side wall from bending under pressing force of the pressing portion against the detected portion.

26. A sheet-supply device for supplying sheets, the sheet-supply device comprising:
a main body and a sheet-supply cassette attachable to and detachable from the main body,
the sheet-supply cassette including:
a guide that guides edges of sheets housed in the sheet-supply cassette, the guide being movable to change position in accordance with size of housed sheets;
a guide cam that changes position integrally with the guide, the guide cam having a cam surface;
a guide cam abutment portion movable selectively toward and away from the guide cam, the guide cam abutment portion moving to a separated position separated from the guide cam when the sheet-supply cassette is detached from the main body; and
a detected portion that moves in a linked manner with the guide cam abutment portion; and
the main body including:
an abutment portion mover that, when the sheet-supply cassette is attached to the main body, moves the guide cam abutment portion until the guide cam abutment portion abuts the cam surface of the guide cam; and
a detection portion that detects the detected portion moved in a linked manner with the guide cam abutment portion;
wherein the cam surface of the guide cam has a shape that varies movement amount of guide cam abutment portion into abutment with the cam surface by the abutment portion mover in accordance with the position of the guide.

27. A sheet-supply device as claimed in claim 26, wherein the sheet-supply cassette further includes an abutment portion urging means that urges the guide cam abutment portion into the separated position, the abutment portion mover moving the guide cam abutment portion into abutment with the cam surface against urging force of the abutment portion urging means.

28. A sheet-supply device as claimed in claim 26, wherein the abutment portion mover includes an absorber that is movably provided on the main body to absorb guide-position-dependent differences in relative movement amount between the guide cam and the guide cam abutment portion.

29. A sheet-supply device as claimed in claim 28, wherein the detected portion includes an engagement portion that is exposed from an outer wall of the sheet-supply cassette, the engagement portion engaging with the abutment portion mover when the sheet-supply cassette is attached to the main body.

30. A sheet-supply device as claimed in claim 26, wherein the detected portion moves linearly following a movement direction in which the sheet-supply cassette moves when the sheet-supply cassette is being attached to and detached from the main body.

31. A sheet-supply device as claimed in claim 26, wherein the detected portion includes an engagement portion that is exposed from an outer wall of the sheet-supply cassette, the engagement portion engaging with the abutment portion mover when the sheet-supply cassette is attached to the main body.

32. A sheet-supply device as claimed in claim 26, wherein:
the detected portion is formed with a plurality of protrusions aligned in a movement direction in which the sheet-supply cassette moves when the sheet-supply cassette is being attached to and detached from the main body, the plurality of protrusions being formed in patterns that differ depending on position in the movement direction; and
the detection portion includes a plurality of switches that turn selectively on and off in accordance with presence and absence of the protrusions, the detection portion detecting movement amount of the detected portion based on on/off pattern of the switches.

33. A sheet-supply device as claimed in claim 26, further comprising:
a sheet-supply unit for supplying sheets out from the sheet-supply cassette; and
an image forming unit for forming images on the sheets supplied by the sheet-supply unit.

34. A sheet-supply device as claimed in claim 26, wherein:
the sheet-supply cassette further includes a cassette body having at least a base and a pair of side walls extending from the base, the detected portion being provided on at least one of the side walls, the detected portion indicating at least one of information relating to sheets housed in the cassette body and information relating the cassette body;
the detection portion has:
a pressing portion that, when the sheet-supply cassette is mounted in the main body, presses the detected portion against the at least one side wall in a direction perpendicular to direction in which the side wall extends from the base; and
an information detection portion that receives repulsive force from the pressing portion pressing against the detected portion and that detects the information indicated by the detected portion based on the repulsive force; and
the main body further includes a side wall support that supports the at least one side wall from bending under pressing force of the pressing portion against the detected portion.

35. An image forming device for forming images on sheets, the image forming device comprising:
a main body and a sheet-supply cassette attachable to and detachable from the main body,
the sheet-supply cassette including:
a cassette body having at least a base and a pair of side walls extending from the base; and
a detected portion provided on at least one of the side walls, the detected portion indicating at least one of information relating to sheets housed in the cassette body and information relating the cassette body; and
the main body including:
a pressing portion that, when the sheet-supply cassette is mounted in the main body, presses the detected portion against the at least one side wall in a direction perpendicular to direction in which the side wall extends from the base;
an information detection portion that receives repulsive force from the pressing portion pressing against the detected portion and that detects the information indicated by the detected portion based on the repulsive force; and
a side wall support that supports the at least one side wall from bending under pressing force of the pressing portion against the detected portion.

36. An image forming device as claimed in claim 35, wherein the information relating to sheets is information indicating size of sheets housed in the sheet-supply cassette.

37. An image forming device as claimed in claim 35, wherein the information relating to the cassette body is information for distinguishing the cassette body from other cassette bodies of other sheet-supply cassettes.

38. An image forming device as claimed in claim 35, wherein the detected portion is provided in a plurality that depends on information to be indicated, the pressing portion being provided in a plurality that corresponds to the plurality of detected portions.

39. An image forming device as claimed in claim 35, wherein the side wall support supports the at least one side wall from a side of the at least one side wall that is opposite from the base with respect to the detected portion.

40. An image forming device as claimed in claim 35, wherein the base and the pair of side walls define an opening at a front of the cassette body with respect to mounting direction of the cassette body into the main body, a switching plate being further provided separately from the cassette body, the switching plate being switchably movable between a closing-off position and an expansion positions the switching plate closing off the front opening when in the closing-off position, the switching plate expanding the holding space of the cassette body when in the expansion position to enable the cassette body to house larger sheets than when the switching plate is in the closing-off position.

41. An image forming device as claimed in claim 35, wherein the side tall support supports the at least one side wall from a side opposite from the base with respect to the detected portion and at a rear side of the at least one side wall provided with the detected portion.

42. A sheet-supply device for supplying sheets to an image forming device, the sheet-supply device comprising:

a main body and a sheet-supply cassette attachable to and detachable from the main body, the sheet-supply cassette including:
- a cassette body having at least a base and a pair of side walls extending from the base; and
- a detected portion provided on at least one of the side walls, the detected portion indicating at least one of information relating to sheets housed in the cassette body and information relating the cassette body; and the main body including:
- a pressing portion that, when the sheet-supply cassette is mounted in the main body, presses the detected portion against the at least one side wall in a direction perpendicular to direction in which the side wall extends from the base;
- an information detection portion that receives repulsive force from the pressing portion pressing against the detected portion and that detects the information indicated by the detected portion based on the repulsive force; and
- a side wall support that supports the at least one side wall from bending under pressing force of the pressing portion against the detected portion.

43. A sheet-supply device as claimed in claim 42, wherein the information relating to sheets is information indicating size of sheets housed in the sheet-supply cassette.

44. A sheet-supply device as claimed in claim 42, wherein the information relating to the cassette body is information for distinguishing the cassette body from other cassette bodies of other sheet-supply cassettes.

45. A sheet-supply device as claimed in claim 42, wherein the detected portion is provided in a plurality that depends on information to be indicated, the pressing portion being provided in a plurality that corresponds to the plurality of detected portions.

46. A sheet-supply device as claimed in claim 42, wherein the side wall support supports the at least one side wall from a side of the at least one side wall that is opposite from the base with respect to the detected portion.

47. A sheet-supply device as claimed in claim 42, wherein the base and the pair of side walls define an opening at a front of the cassette body with respect to mounting direction of the cassette body into the main body, a switching plate being further provided separately from the cassette body, the switching plate being switchably movable between a closing-off position and an expansion position, the switching plate closing off the front opening when in the closing-off position, the switching plate expanding the holding space of the cassette body when in the expansion position to enable the cassette body to house larger sheets than when the switching plate is in the closing-off position.

48. A sheet-supply device as claimed in claim 42, wherein the side wall support supports the at least one side wall from a side opposite from the base with respect to the detected portion and at a rear side of the at least one side wall provided with the detected portion.

49. A sheet-supply cassette used mounted in a sheet-supply device including a side wall supporter, the sheet-supply cassette comprising:
- a cassette body having at least a base and a pair of side walls extending from the base, the base and the pair of side walls defining an opening at a front of the cassette body with respect to a mounting direction of the cassette body into the sheet-supply device;
- a detected portion provided on at least one of the side walls, the detected portion indicating, in a manner adapted for detection by the sheet-supply device, at least one of information relating to sheets housed in the cassette body and information relating the cassette body; and
- a switching plate provided separately from the cassette body, the switching plate being switchably movable between a closing-off position and an expansion position, the switching plate closing off the front opening when in the closing-off position, the switching plate expanding the holding space of the cassette body when in the expansion position to enable the cassette body to house larger sheets than when the switching plate is in the closing-off position,
wherein a free side of the at least one side is provided with a supported portion that contacts and is supported by the side wall supporter when the sheet-supply cassette is mounted in the sheet-supply device, the supported portion extending further from the base than a portion of the switching plate that is positioned near the supported portion.

50. A sheet-supply cassette adapted for insertion into a sheet-supply device body, the sheet-supply cassette comprising;
- a guide that guides edges of sheets housed in the sheet-supply cassette, the guide being movable to change position in accordance with size of housed sheets;
- a cam abutment portion that moves to a position that corresponds to the position of the guide;
- a cam with a cam surface, the cam being moved away from the cam abutment portion during an uninserted condition until the cam surface is separated from the cam abutment portion and toward the cam abutment portion during insertion until the cam surface abuts the cam abutment portion, the cam surface having a shape that varies movement amount of the cam into abutment with the abutment portion during insertion in accordance with the position of the guide; and
- a detected portion that moves in a linked manner with the cam.

51. A sheet-supply cassette adapted for insertion into a sheet-supply device body, the sheet-supply cassette comprising;
- a guide that guides edges of sheets housed in the sheet-supply cassette, the guide being movable to change position in accordance with size of housed sheets;
- a cam that moves to a position that corresponds to the position of the guide, the cam having a cam surface;
- a cam abutment portion that is moved away from the cam surface during an uninserted condition until the cam abutment portion is separated from the cam surface and toward the cam surface during insertion until the cam abutment portion abuts the cam surface; and
- a detected portion that moves in a linked manner with the cam, wherein the cam surface has a shape that varies movement amount of the cam abutment portion into abutment with the cam surface during insertion in accordance with the position of the guide.

* * * * *